United States Patent
Han et al.

(10) Patent No.: US 11,533,220 B2
(45) Date of Patent: *Dec. 20, 2022

(54) NETWORK-ASSISTED CONSENSUS PROTOCOL

(71) Applicants: AT&T Intellectual Property I, L.P., Atlanta, GA (US); Regents of the University of Minnesota, Minneapolis, MN (US)

(72) Inventors: Bo Han, Bridgewater, NJ (US); Vijay Gopalakrishnan, Edison, NJ (US); Marco Platania, Maplewood, NJ (US); Zhi-Li Zhang, Eden Prairie, MN (US); Yang Zhang, St. Paul, MN (US)

(73) Assignees: AT&T Intellectual Property I, L.P., Atlanta, GA (US); Regents of the University of Minnesota, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,280

(22) Filed: Nov. 23, 2020

(65) Prior Publication Data
US 2021/0105177 A1    Apr. 8, 2021

Related U.S. Application Data

(63) Continuation of application No. 16/101,751, filed on Aug. 13, 2018, now Pat. No. 10,848,375.

(51) Int. Cl.
*H04L 41/0668* (2022.01)
*H04L 67/1087* (2022.01)
(Continued)

(52) U.S. Cl.
CPC ........ *H04L 41/0668* (2013.01); *H04L 49/355* (2013.01); *H04L 67/1051* (2013.01);
(Continued)

(58) Field of Classification Search
CPC ............ H04L 41/0668; H04L 67/1093; H04L 49/355; H04L 45/64; H04L 67/1051; H04L 67/1097
(Continued)

(56) References Cited

U.S. PATENT DOCUMENTS 6,651,242 B1   11/2003   Hebbagodi et al.
6,687,847 B1   2/2004    Aguilera et al.
(Continued)

FOREIGN PATENT DOCUMENTS

CN    106789095     5/2017
WO    WO 00/60825   10/2000
(Continued)

OTHER PUBLICATIONS

Weinsberg et al., "Accelerating Distributed Computing Applications Using a Network Offloading Framework," 2007 IEEE International Parallel and Distributed Processing Symposium, Mar. 26-30, 2007.
(Continued)

*Primary Examiner* — Yair Leibovich
(74) *Attorney, Agent, or Firm* — Hartman & Citrin LLC

(57) ABSTRACT

The concepts and technologies disclosed herein are directed to a network-assisted Raft consensus protocol, referred to herein as "NetRaft." According to one aspect of the concepts and technologies disclosed herein, a system can include a plurality of servers operating in a server cluster, and a plurality of P4 switches corresponding to the plurality of servers. Each server of the plurality of servers can include a back-end that executes a complete Raft algorithm to perform leader election, log replication, and log commitment of a Raft consensus algorithm. Each P4 switch of the plurality of P4 switches can include a front-end that executes a partial Raft algorithm to perform the log replication and the log commitment of the Raft consensus algorithm. The back-end
(Continued)

can maintain a complete state for responding to requests that cannot be fulfilled by the front-end. The requests can include read requests and/or write requests.

11 Claims, 17 Drawing Sheets

(51) Int. Cl.
  *H04L 49/35* (2022.01)
  *H04L 67/1042* (2022.01)
  *H04L 45/64* (2022.01)
  *H04L 67/1097* (2022.01)
  *H04L 67/104* (2022.01)

(52) U.S. Cl.
  CPC .......... *H04L 67/1093* (2013.01); *H04L 45/64* (2013.01); *H04L 67/1097* (2013.01)

(58) Field of Classification Search
  USPC ........................................................ 714/4.11
  See application file for complete search history.

(56) References Cited

U.S. PATENT DOCUMENTS

| | | | |
|---|---|---|---|
| 7,113,980 B2 | 9/2006 | Jacobs et al. | |
| 7,185,236 B1 | 2/2007 | Moser et al. | |
| 7,408,945 B2 | 8/2008 | Balazich et al. | |
| 7,539,995 B2 | 5/2009 | Supalov | |
| 7,636,372 B2 | 12/2009 | Fan et al. | |
| 7,660,949 B2 | 2/2010 | Jacobs et al. | |
| 7,797,457 B2 | 9/2010 | Lamport | |
| 7,814,064 B2 | 10/2010 | Vingralek | |
| 7,886,083 B2 | 2/2011 | Pinkerton et al. | |
| 7,937,482 B1 | 5/2011 | Vermeulen et al. | |
| 8,005,917 B2 | 8/2011 | Cooper | |
| 8,856,593 B2 | 10/2014 | Eckhardt et al. | |
| 9,172,670 B1 | 10/2015 | Gupta et al. | |
| 9,419,854 B1 | 8/2016 | Wang et al. | |
| 9,588,924 B2 | 3/2017 | Kathmann et al. | |
| 9,690,675 B2 | 6/2017 | Madduri et al. | |
| 9,910,697 B2 | 3/2018 | DeArment | |
| 9,923,768 B2 | 3/2018 | Dellisanti et al. | |
| 10,848,375 B2 * | 11/2020 | Han | H04L 49/355 |
| 2005/0289152 A1 * | 12/2005 | Earl | G06F 16/184 |
| 2010/0082728 A1 * | 4/2010 | Cooper | H04L 67/562 |
| | | | 709/202 |
| 2014/0189039 A1 | 7/2014 | Dalton et al. | |
| 2015/0379009 A1 | 12/2015 | Reddy et al. | |
| 2017/0270176 A1 | 9/2017 | Horowitz et al. | |
| 2017/0364273 A1 | 12/2017 | Schreter | |
| 2018/0063238 A1 | 3/2018 | Zhang | |
| 2018/0295546 A1 * | 10/2018 | Crawford | H04W 36/0083 |
| 2019/0146884 A1 | 5/2019 | Gangadharappa | |
| 2020/0028776 A1 | 1/2020 | Atli | |

FOREIGN PATENT DOCUMENTS

| | | |
|---|---|---|
| WO | WO 2017/179059 | 10/2017 |
| WO | WO 2018/065411 | 4/2018 |

OTHER PUBLICATIONS

Chase, Jeff, "Distributed Systems, Failures, and Consensus," Duke University, retrieved at https://www2.cs.duke.edu/courses/fall07/cps212/consensus.pdf on Apr. 25, 2018.

Chen et al., "Programmable Switch as a Parallel Computing Device," Mar. 5, 2018, retrieved at https://arxiv.org/pdf/1803.01491.pdf.

U.S. Office Action dated Mar. 13, 2020 in U.S. Appl. No. 16/101,751.

U.S. Notice of Allowance dated Jul. 14, 2020 in U.S. Appl. No. 16/101,751.

* cited by examiner

NETWORK-ASSISTED CONSENSUS PROTOCOL

CROSS-REFERENCE TO RELATED APPLICATIONS

This application is a continuation of and claims priority to U.S. patent application Ser. No. 16/101,751, entitled "Network-Assisted Raft Consensus Protocol," filed Aug. 13, 2018, now U.S. Pat. No. 10,848,375, which is incorporated herein by reference in its entirety.

STATEMENT REGARDING FEDERALLY SPONSORED RESEARCH OR DEVELOPMENT

This invention was made with government support under CNS-1617729 and CNS-1618339 awarded by the National Science Foundation. Additionally, this invention was made with government support under Grant No. HDTRA1-14-1-0040 awarded by the Department of Defense/Defense Advanced Research Projects Agency (DARPA). The government has certain rights in the invention.

BACKGROUND

Distributed systems often require participants to agree on some data value that is needed during computation. Consensus algorithms (e.g., Paxos, ZAB, and Raft) facilitate the participants to reach consensus, even in the face of failures. These consensus mechanisms tend to incur high overheads in terms of latency since they involve multiple rounds of communication. This is especially true when strong consistency guarantees are desired. Even without failure, consensus requires at least the round-trip time between servers running consensus algorithms.

Raft is a consensus algorithm designed as an alternative to Paxos. Raft was designed to be more understandable than Paxos, and Raft is formally proven safe. Raft also provides a better foundation for building practical systems. To enhance understandability, Raft separates the main consensus components into the following sub-problems: 1) Leader election: a new leader is elected when the current leader fails; 2) Log replication: the leader accepts log entries from clients and replicates them, forcing other logs to be consistent with its own log; and 3) Log commitment: few restrictions are enforced to ensure safe log commitment, that is—if any member applied a particular command to its state machine, then no other member may apply a different command for the same entry. Raft starts by electing a strong leader, and then gives the leader full responsibility for managing the replicated log. The leader accepts log entries from clients (i.e., end devices making requests), and replicates the log entries to other servers. When it is safe to apply log entries to the state machines, the leader notifies the servers to apply the log entries to their local state machines.

P4 is a language to program data-plane behavior of network devices. P4 can be used to support customized functionality (e.g., the evolving OpenFlow standard), specific datacenter packet processing logic, etc. The P4 language composes an abstract forwarding model that uses a chain of tables for packet processing. The tables match pre-defined packet fields, and perform a sequence of actions. Then, a P4 compiler takes charge of the abstract forwarding model to a concrete implementation on a particular target platform (e.g., software switches, field-programmable gate arrays ("FPGAs"), and the like).

SUMMARY

Concepts and technologies disclosed herein are directed to a network-assisted Raft consensus protocol, referred to herein as "NetRaft." According to one aspect of the concepts and technologies disclosed herein, a system can include a plurality of servers operating in a server cluster, and a plurality of P4 switches corresponding to the plurality of servers. Each server of the plurality of servers can include a back-end that executes a complete Raft algorithm to perform leader election, log replication, and log commitment of a Raft consensus algorithm. Each P4 switch of the plurality of P4 switches can include a front-end that executes a partial Raft algorithm to perform the log replication and the log commitment of the Raft consensus algorithm. The back-end can maintain a complete state for responding to requests that cannot be fulfilled by the front-end. The requests can include read requests and/or write requests.

According to another aspect of the concepts and technologies disclosed herein, a first server operating in a server cluster can receive, from a client, a read request message. The first server in this case is not recognized as a leader in the server cluster. A first P4 switch in communication with the first server can receive, from the client the read request message. The first P4 switch can forward the read request message to a second server that is recognized as the leader in the server cluster. A second P4 switch in communication with the second server can receive the read request message immediately without involving the second server.

According to another aspect of the concepts and technologies disclosed herein, a first server operating in a server cluster can receive, from a client, a write request message. The first server in this case is recognized as a leader in the server cluster. A first P4 switch in communication with the first server can receive, from the first client, the write request message. The first P4 switch can handle the write request message. The first P4 switch can notify, without involving the first server, a second server and a third server of the cluster of write request results resulting from the first P4 switch handling the write request message.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
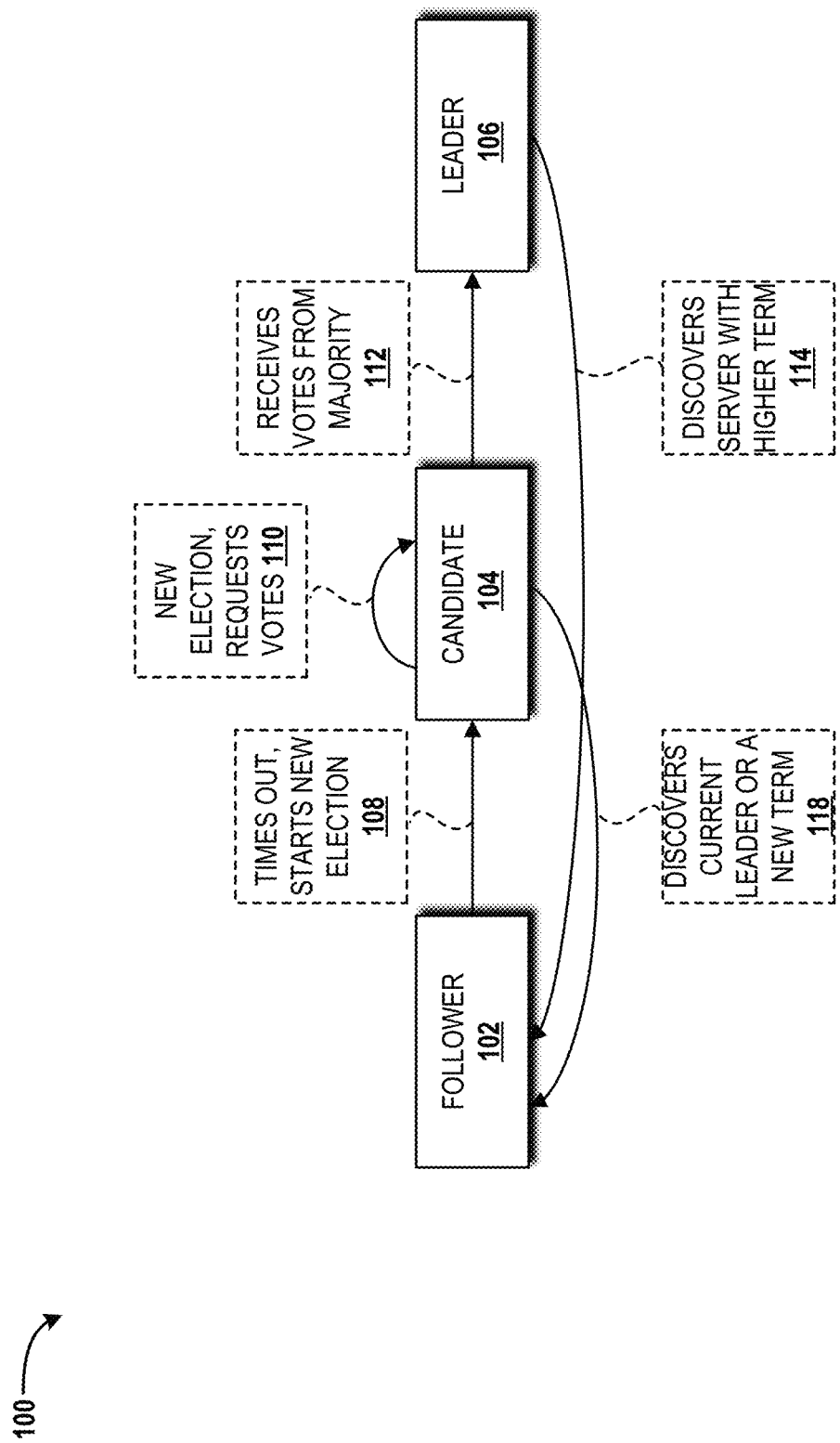
FIG. 1 is a block diagram illustrating a legacy Raft algorithm overview of a legacy Raft consensus algorithm.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Distributed systems often require participants to agree on some data value that is needed during computation. Consensus algorithms (e.g., Paxos, ZAB, and Raft) facilitate the participants to reach consensus, even in the face of failures. These consensus mechanisms tend to incur high overheads in terms of latency since they involve multiple rounds of communication. This is especially true when strong consistency guarantees are desired. Even without failure, consensus requires at least the round-trip time between servers running consensus algorithms. Thus, offloading application level implementation of a consensus algorithm to the network offers the potential to reduce the consensus latency.

Several recent projects investigate the offloading of consensus algorithms to the network. NetPaxos proposes implementing Paxos in the network by utilizing OpenFlow switches. NetPaxos can also be implemented using P4, a domain specific language that allows the programming of a packet-forwarding data plane. Other efforts have been made to implement the entire ZAB consensus algorithm on FPGA devices using a low-level language. This hardware-based solution, however, might not be scalable as it requires the storage of potentially large amounts of consensus states, logic, and even the application data.

In contrast, the concepts and technologies disclosed herein propose a network-assisted Raft consensus algorithm that takes advantage of programmable P4 switches and offloads certain Raft functionality to the network. The proposed algorithm is referred to herein as "NetRaft." The concepts and technologies disclosed herein focus on Raft since it has formally proven to be safe and is more understandable than Paxos. Moreover, Raft has been used in the implementation of popular software-defined networking ("SDN") controllers, such as OpenDayLight.

NetRaft effectively reduces consensus latency, is failure-aware, and does not sacrifice correctness or scalability. To enable Raft-aware forwarding and quick response, NetRaft uses P4-based programmable switches and offloads partial Raft functionality to the switch. The concepts and technologies disclosed herein demonstrate the efficacy of this approach and the performance improvements NetRaft offers via a prototype implementation.

Raft is a consensus algorithm designed as an alternative to Paxos. The designers of Raft intended the algorithm to be more understandable than Paxos, and Raft has been formally proven safe. Raft also provides a better foundation for building practical systems. To enhance understandability, Raft separates the main consensus components into the following sub-problems: 1) Leader election: a new leader is elected when the current leader fails; 2) Log replication: the leader accepts log entries from clients and replicates the log entries, forcing other logs to be consistent with the leader's log; and 3) Log commitment: few restrictions are enforced to ensure safe log commitment—that is, if any member applied a particular command to its state machine, then no other member may apply a different command for the same entry. Raft starts by electing a strong leader, and then gives the leader full responsibility for managing the replicated log. The leader accepts log entries from clients (e.g., end devices making requests), and replicates the log entries to other servers. When it is safe to apply log entries to the state machines, the leader notifies the other servers to apply the log entries to their respective local state machines.

Turning now to FIG. 1, a block diagram illustrating a legacy Raft algorithm overview 100 of a legacy Raft consensus algorithm will be described. Raft server clusters typically contain an odd number of members (e.g., five servers and two failures). Each server in a Raft server cluster can be in one of three states: a follower state 102 ("follower(s) 102"), a candidate state ("candidate(s) 104"), or a leader state 106 ("leader 106"). Typically, a Raft server cluster has one server operating as the leader 106 and the other servers operating as the followers 102. The followers 102 can passively receive remote procedure calls ("RPCs")

from the leader 106 or the candidate(s) 104. The candidate(s) 104 can initiate an election to become the leader 106 after receiving majority votes from the servers in the Raft server cluster. The leader 106 responds to requests received from clients and replicates corresponding log entries to the follower(s) 102. If a client sends a request to one of the followers 102 instead of the leader 106, the follower 102 can redirect the request to the leader 106.

Figure 2:
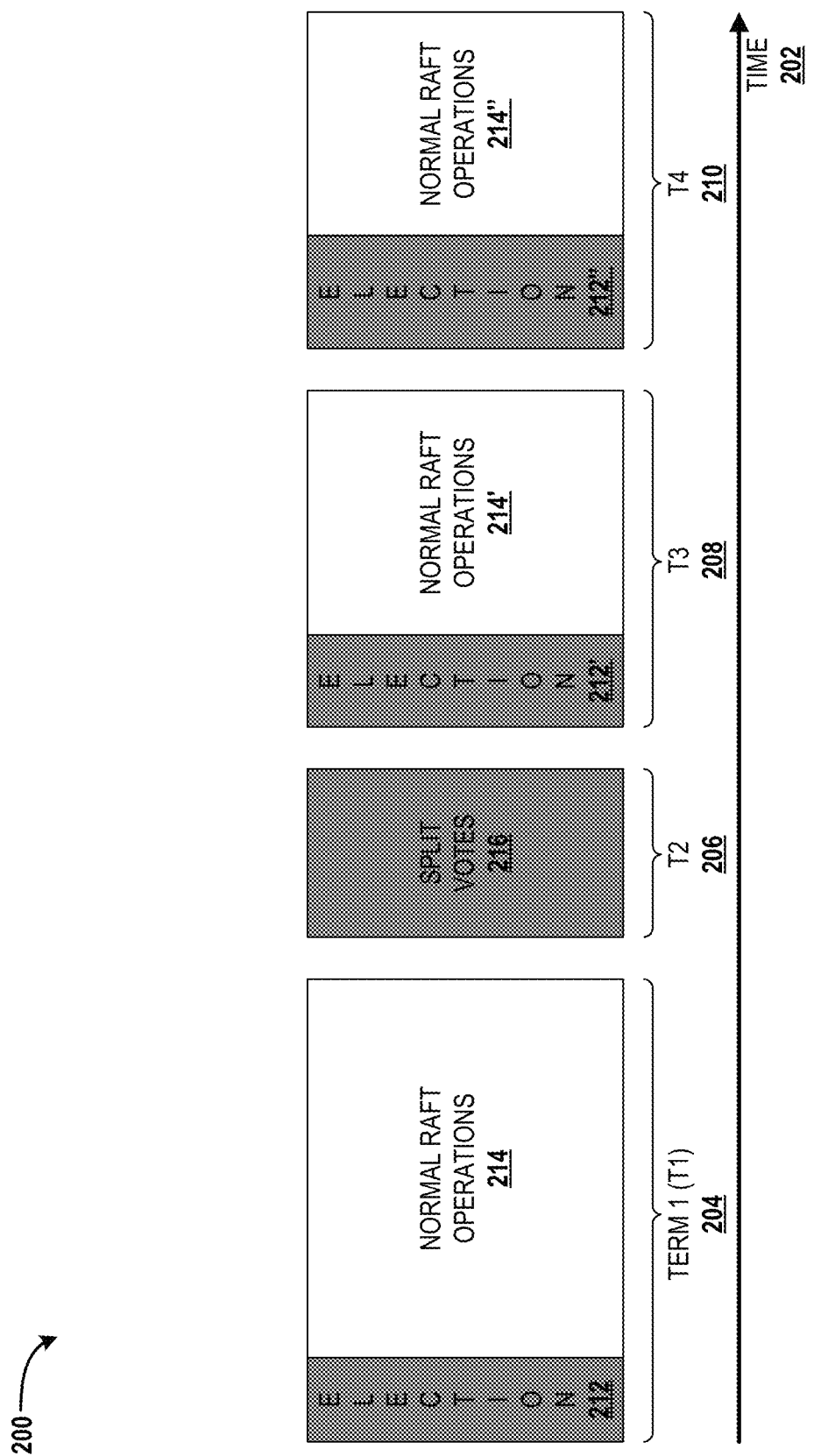
FIG. 2 is a block diagram illustrating an overview of Raft terms.

Turning now to FIG. 2, a block diagram illustrating a Raft terms overview 200 will be described. The Raft terms overview 200 illustrates time 202 that is divided into four terms 204, 206, 208, 210 of arbitrary length. The terms 204, 206, 208, 210 are monotonically increasing integers, where each term 204, 206, 208, 210 begins with an election. If a given candidate 104 wins an election (i.e., a successful "election 212, 212', 212""), the candidate 104 will serve as the leader 106 for the rest of the corresponding term. For example, terms 204 ("T1"), 208 ("T3"), 210 ("T4") each begins with a successful election 212, 212', 212", and continues thereafter with normal Raft operations 214, 214', 214". Term 206 ("T2"), however, leads to split votes 216, resulting in no successful election 212 and no normal Raft operations 214.

Terms 204, 206, 208, 210 allow Raft servers to detect obsolete information, such as information stored by stale leaders. Current terms are exchanged whenever servers communicate using RPCs. When a leader 106 or a candidate 104 learns that its current term is out of date (i.e., there exists a higher term number among the server cluster), the leader 106 or the candidate 104 immediately reverts to the follower state 102. If a server receives a request (e.g., either a vote request or a request to replicate a log entry), from the leader 106, with a stale term number, the server will reject the request.

The concept of electing the leader 106 will now be described with reference to FIGS. 1 and 2. The leader 106 of a Raft server cluster sends periodically heartbeats to the followers 102. All other servers remain in the follower state 102 as long as they are receiving heartbeats from the (current) leader 106. If a given follower 102 does not receive a heartbeat message during a predefined period of time (referred to herein as an "election timeout"), the follower 102 assumes that there is no leader 106 and starts a new election (108). To start a new election, the follower 102 that encountered the election timeout increments its current term, votes for itself, and transitions to the candidate state 104. The newly-transitioned follower 102 to candidate 104 then sends RequestVote RPCs to all other servers in the server cluster (110).

The candidate 104 wins the election if it receives votes from a majority of the other servers for its term (112). Then, the candidate 104 transitions to the leader state 106 and sends heartbeats to all other servers in the server cluster to prevent new elections and to establish its authority for its term.

While waiting for votes, the candidate 104 might receive a heartbeat message from another server claiming to be the leader 106. If the received term number is at least as large as the candidate's 104 current term, then the candidate 104 will surrender candidateship and transition back to the follower state 102 (114).

If none of the candidates 104 receives a majority vote, one of the candidates 104 will timeout due to not receiving heartbeat messages from any leader 106. That particular candidate 104 then will start a new election (110). Raft uses randomized timeouts to ensure that split votes 216 (e.g., as shown at T2 206 in FIG. 2) are a rare event. If one of the candidates 104 discovers the current leader 106 or a new term, that candidate reverts back to the follower state 102 (118).

To ensure safe log commitment, Raft enforces restrictions on elected leaders to guarantee that all committed entries from previous terms are present on the new leader. During the election process, a candidate must receive a majority vote from the server cluster. A server in the cluster will vote for the candidate with a higher term and the candidate with a log that is at least as up-to-date as its own log. Otherwise, the server rejects the vote request. Therefore, receiving a majority vote means that the log of the new leader contains all committed entries.

Figure 3:
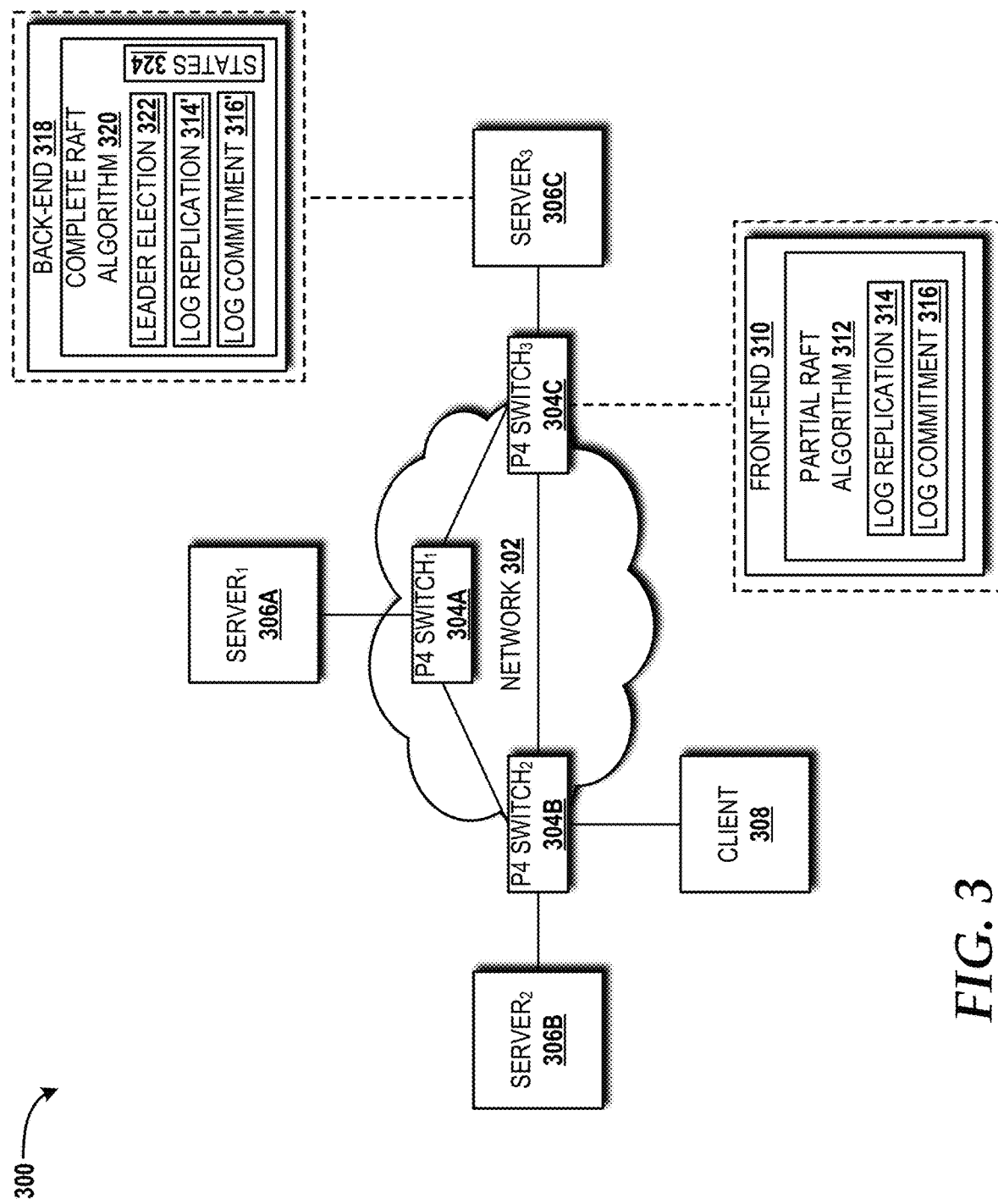
FIG. 3 is a block diagram illustrating aspects of a NetRaft system architecture, according to an illustrative embodiment.

Turning now to FIG. 3, a block diagram illustrating aspects of a NetRaft system architecture 300 will be described, according to an illustrative embodiment. The NetRaft system architecture 300 includes a network 302 with which a plurality of P4 switches 304 corresponding to a plurality of servers 306 are in communication. In particular, P4 SWITCH$_1$ 304A is shown in communication with SERVER$_1$ 306A; P4 SWITCH$_2$ 304B is shown in communication with SERVER$_2$ 306B; and P4 SWITCH$_3$ 304C is shown in communication with SERVER$_3$ 306C. Although only three P4 switches 304 and three servers 306 are shown, those skilled in the art will appreciate implementations with different complexity (i.e., greater or fewer number of P4 switches 304 and/or servers 306) are possible. The NetRaft system architecture 300 also shows a client 308 operating in communication with the P4 SWITCH$_2$ 304B.

The network 302 can be or can include any packet network capable of exchanging data packets (e.g., among the client 308, the P4 switches 304, and the servers 306). Additional details regarding the network 302 are provided herein with reference to FIG. 14.

The P4 switches 304 utilize the P4 language to control data-plane behavior. The P4 language can be used to support customized functionality (e.g., the evolving OpenFlow standard), specific data-center packet processing logic, and the like. The P4 language composes an abstract forwarding model that uses a chain of tables for packet processing. The tables match pre-defined packet fields, and perform a sequence of actions. A P4 compiler then takes charge of applying the abstract forwarding model to create a concrete implementation on a particular target platform (e.g., the P4 switches 304).

There are five major components in a P4 program: 1) control blocks that specify a way of composing tables; 2) tables that specify packet processing logic, a high-level behavior representation about field matching and corresponding actions; 3) customized packet header fields that are a collection of packet bytes; 4) a packet header parser that describes a way of transforming incoming packets to field matching instances; and 5) actions that forward or drop packets, modify fields, perform stateful memory operations, and encapsulate or decapsulate headers.

NetRaft uses registers to keep track of Raft states like logs and state machines. Registers provide persistent states that can be organized as an array of cells. NetRaft specifies the size of each cell and the number of cells in the array of cells when declaring a register for Raft state.

A unique feature of NetRaft is the ability to duplicate only the necessary logic to the P4 switches 304 that act as a cache to reduce consensus latency. Thus, NetRaft minimizes the storage of replicated log entries and state machines in the P4 switches 304. As will be described in further detail below, in NetRaft, the entire Raft algorithm is still running on the servers 306. This partial offloading architecture helps improve the performance of Raft, especially the consensus latency, without sacrificing scalability.

The concepts and technologies disclosed herein aim to improve the performance of Raft without sacrificing correctness and scalability by the introduction of NetRaft. As described above with reference to FIG. 1, Raft has three roles: the leader 106 who maintains consensus in a centralized way, the follower(s) 102 who passively respond(s) to Raft RPCs, and the candidate(s) 104 who is/are converted/transitioned from a follower 102 during leader election when the original leader fails. The basic version of legacy Raft has only two RPCs: RequestVote issued by a candidate during election and AppendEntries issued by the leader to send heartbeats or log entries. Thus, legacy Raft has only four message types (two RPCs and two responses) compared to ten types in ZAB. NetRaft offloads the processing of AppendEntries messages and the responses of RequestVote to the P4 switches 304.

There are three fundamental requirements for a successful implementation of NetRaft. First, the implementation should guarantee the correctness of the Raft algorithm when offloading its processing logic to the P4 switches 304. Second, the Raft logic on the P4 switches 304 should be able to respond to most requests directly for improved performance. Third, the Raft logic on the P4 switches 304 should safely discard obsolete log entries and state machines for scalability. As mentioned above, in the basic Raft consensus algorithm, there are three major elements: leader election, log replication, and log commitment.

To satisfy the above requirements, the illustrated NetRaft system architecture 300 includes two components: a front-end 310 implemented in the P4 switch 304 (in the illustrated embodiment, the P4 SWITCH$_3$ 304C) executing a partial Raft algorithm 312 to perform log replication 314 and log commitment 316 elements for NetRaft, and a back-end 318 in the server 306 (in the illustrated embodiment, the SERVER$_3$ 306C) running a complete Raft algorithm 320. Log replication 314, 314' and log commitment 316, 316' elements are duplicated at the front-end 310 and the back-end 318 to improve performance and scalability. The front-end 310 enhances Raft in two aspects. In particular, the front-end 310 is able to perform Raft-aware forwarding, and can quickly respond to Raft requests by rewriting the incoming packets. A job of the back-end 318 is to execute the complete Raft algorithm 320 to perform leader election 322 and to maintain complete states 324 on the server 306 for responding to certain requests that might not be fulfilled by the front-end 310.

The P4 switch, via the front-end 310, parses Raft request messages and caches Raft states using P4's primitive actions. Upon receiving a request, the front-end 310 parses the request message and rewrites the request message to construct a corresponding response message. The front-end 310 also forwards the original packet to the back-end 318 for a liveness check. The back-end 318 sends a response message to the P4 switch 304, but the front-end 310 does not forward the response message, and instead, only extracts any necessary flow control information therefrom. For certain requests, the front-end 310 might not be able to generate a response due to the limited information available on the P4 switch 304; such a request will be served normally by the back-end 318. For example, when a new server joins the server cluster, the new server attempts to fetch all the logs. These logs might not all be available at the front-end 310, and in such instances, the back-end 318 would serve the request.

The front-end 310 can forward certain Raft messages without involving the back-end 318. In Raft, requests from the client 308 can only be handled by the leader 106. In the bootstrap phase, the client 308 randomly picks a server in the cluster with which to communicate. If the selected server is not the leader 106, the selected server notifies the client 308 of the leader's IP address (if known). The client 308 then issues a new request to the leader 106. In NetRaft, since the front-end 310 is aware of Raft (via implementation of the partial Raft algorithm 312), the front-end 310 of the selected server can forward the request to the leader 106 directly and reduce the communication overhead, as will be described in greater detail below with reference to FIGS. 4A-4B and 5A-5B.

The front-end 310 can discard obsolete information because the back-end 318 always keeps the necessary information. However, the mechanism for discarding state machines is different from discarding obsolete log entries because the front-end 310 needs to know whether a requested item is already in the front-end 310 state machine or the back-end state machine. Thus, before discarding a state machine cached in the front-end 310, the front-end 310 ensures the back-end 318 is in sync before deleting state information.

Figure 4A:
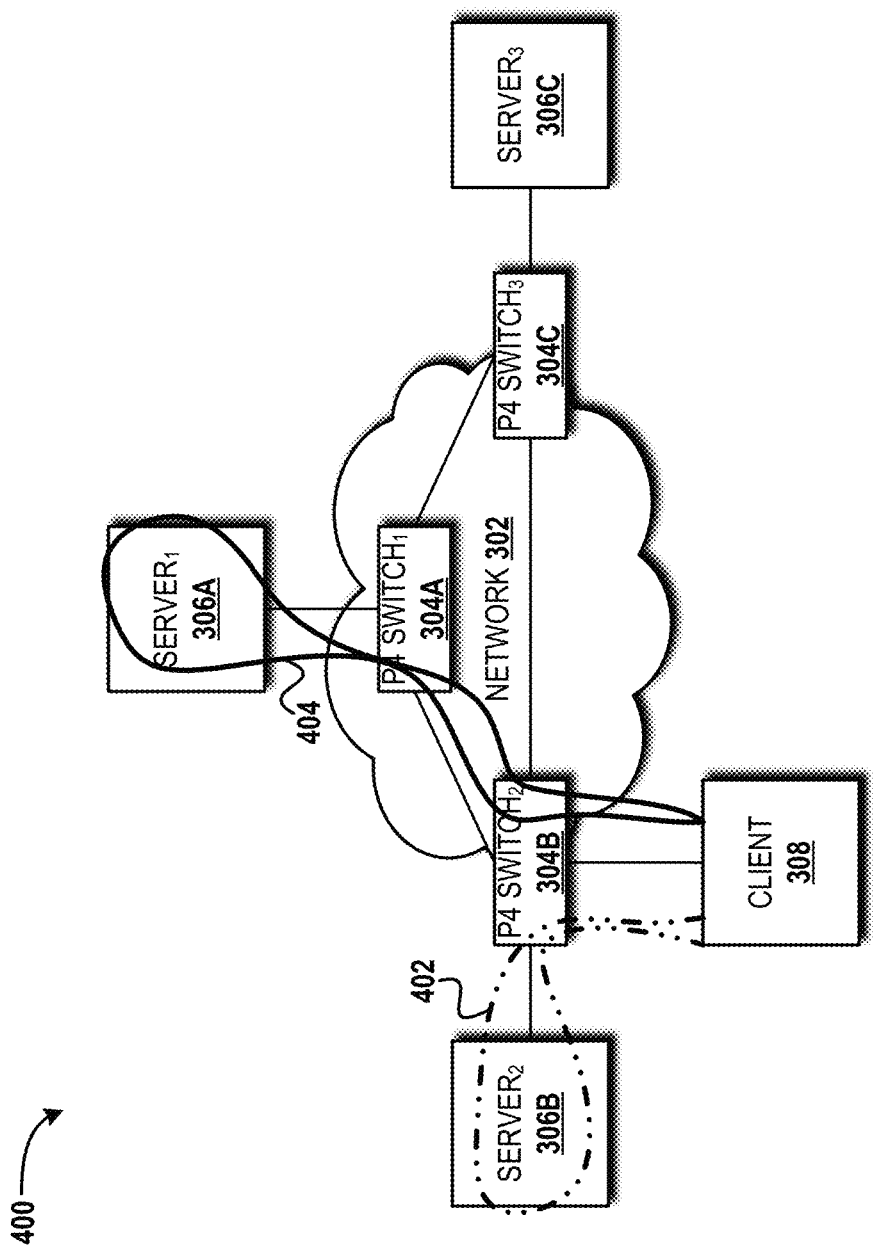
FIG. 4A is a block diagram illustrating aspects of a legacy Raft read operation.
Figure 4B:
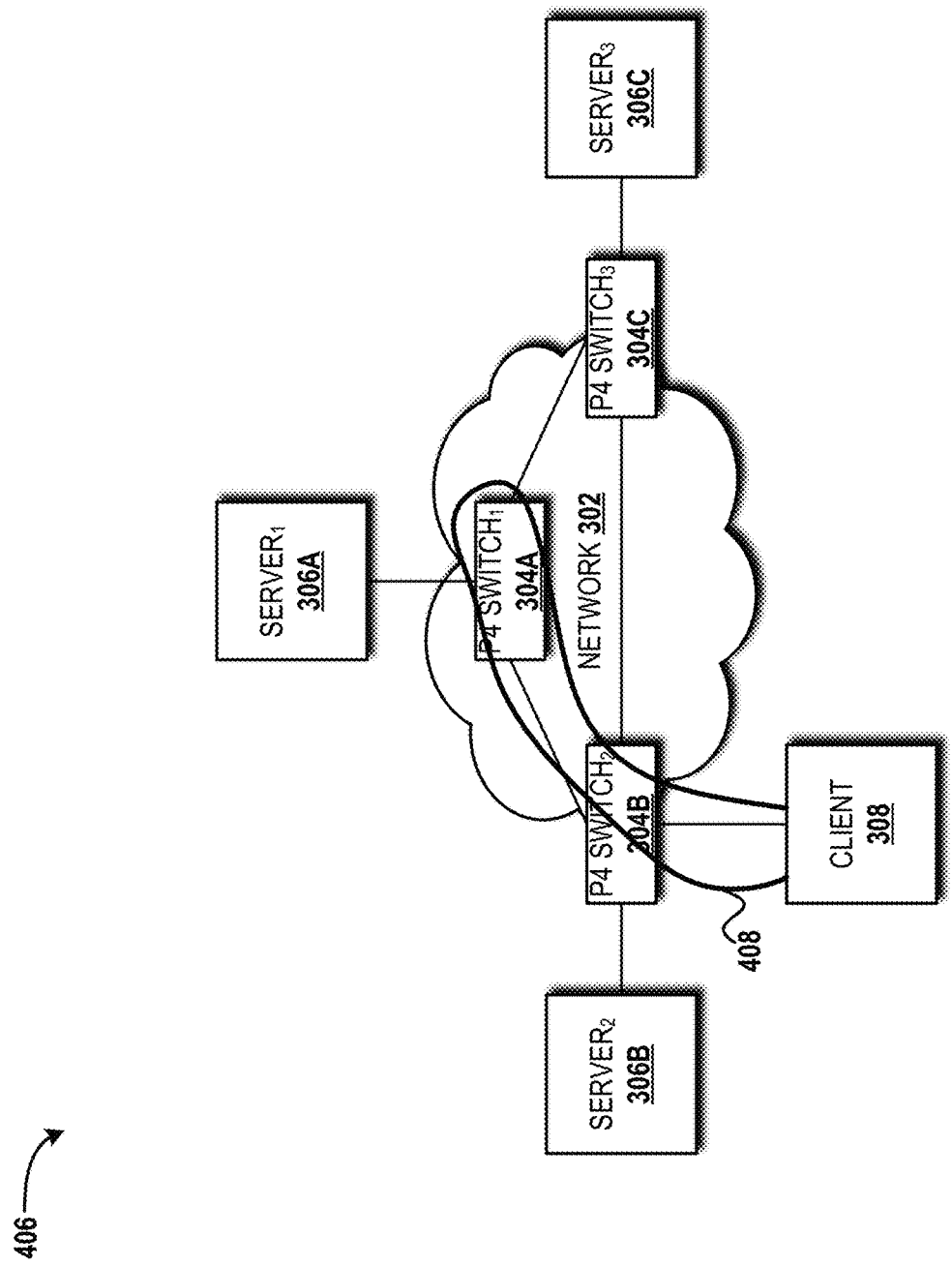
FIG. 4B is a block diagram illustrating aspects of a NetRaft read operation.

Turning now to FIGS. 4A-4B, block diagrams illustrating a comparison between a read operation as performed by legacy raft (400) and a read operation as performed by NetRaft (406) will be described. In both cases, the client 308 sends (402) a read request to the SERVER$_2$ 306B, which is not the leader 106. In legacy raft (400), the SERVER$_2$ 306B will notify the client 308 that the SERVER$_1$ 306A is the leader 106 and then the client 308 re-sends (404) the read request to the SERVER$_1$ 306A. In NetRaft (406), a Raft-aware switch, P4 SWITCH$_2$ 304B, connected to the SERVER$_2$ 306B receives the read request and then forwards it to the leader 106 (SERVER$_1$ 306A) directly (408). Since P4 SWITCH$_1$ 304A is Raft-aware (via implementation of the partial Raft algorithm 312) and is connected to the SERVER$_1$ 306A operating in the leader state 106 and having the latest information, the P4 SWITCH$_1$ 304A can reply to the client's request immediately without involving the SERVER$_1$ 306A.

Figure 5A:
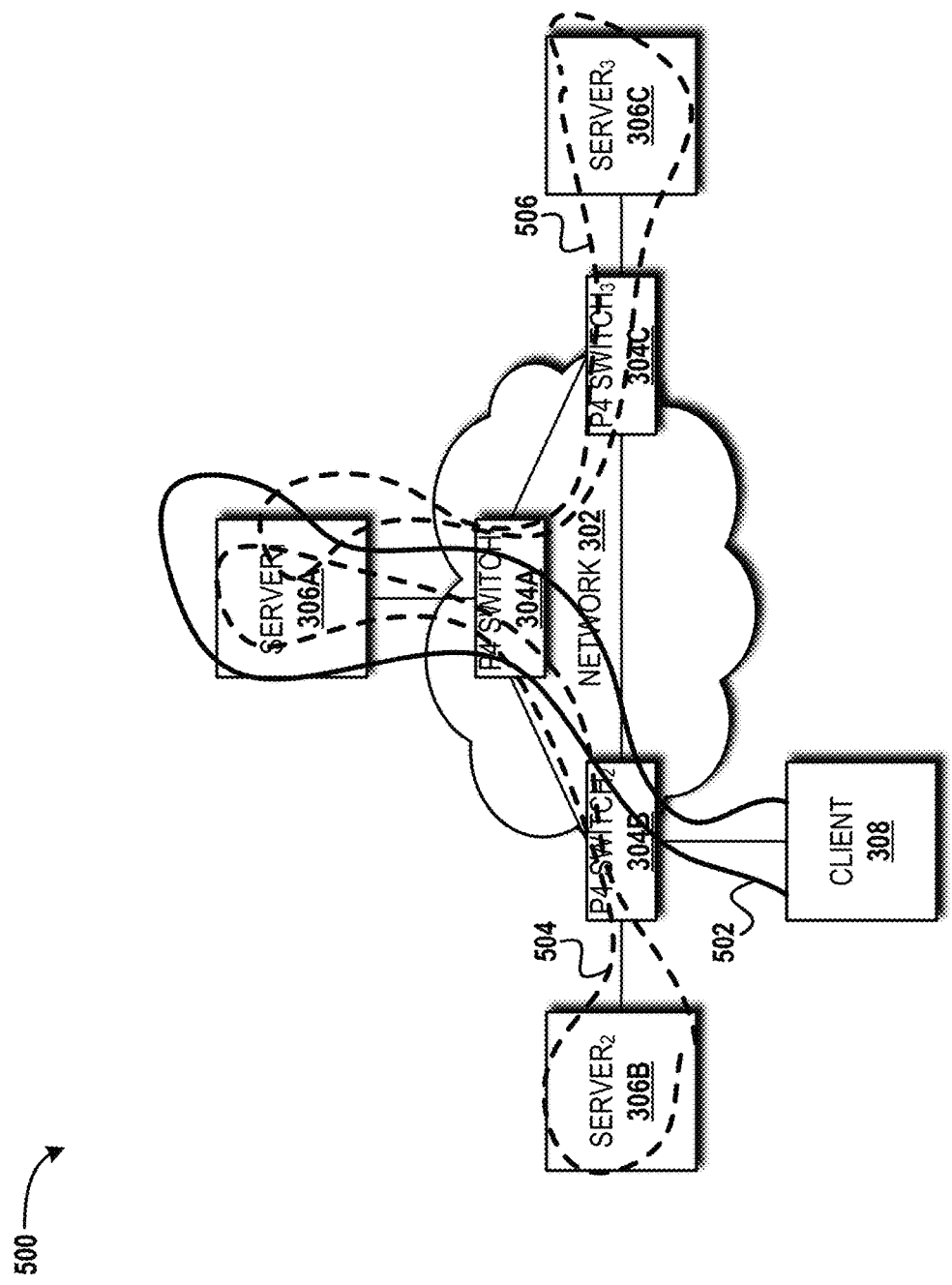
FIG. 5A is a block diagram illustrating aspects of a legacy Raft write operation.
Figure 5B:
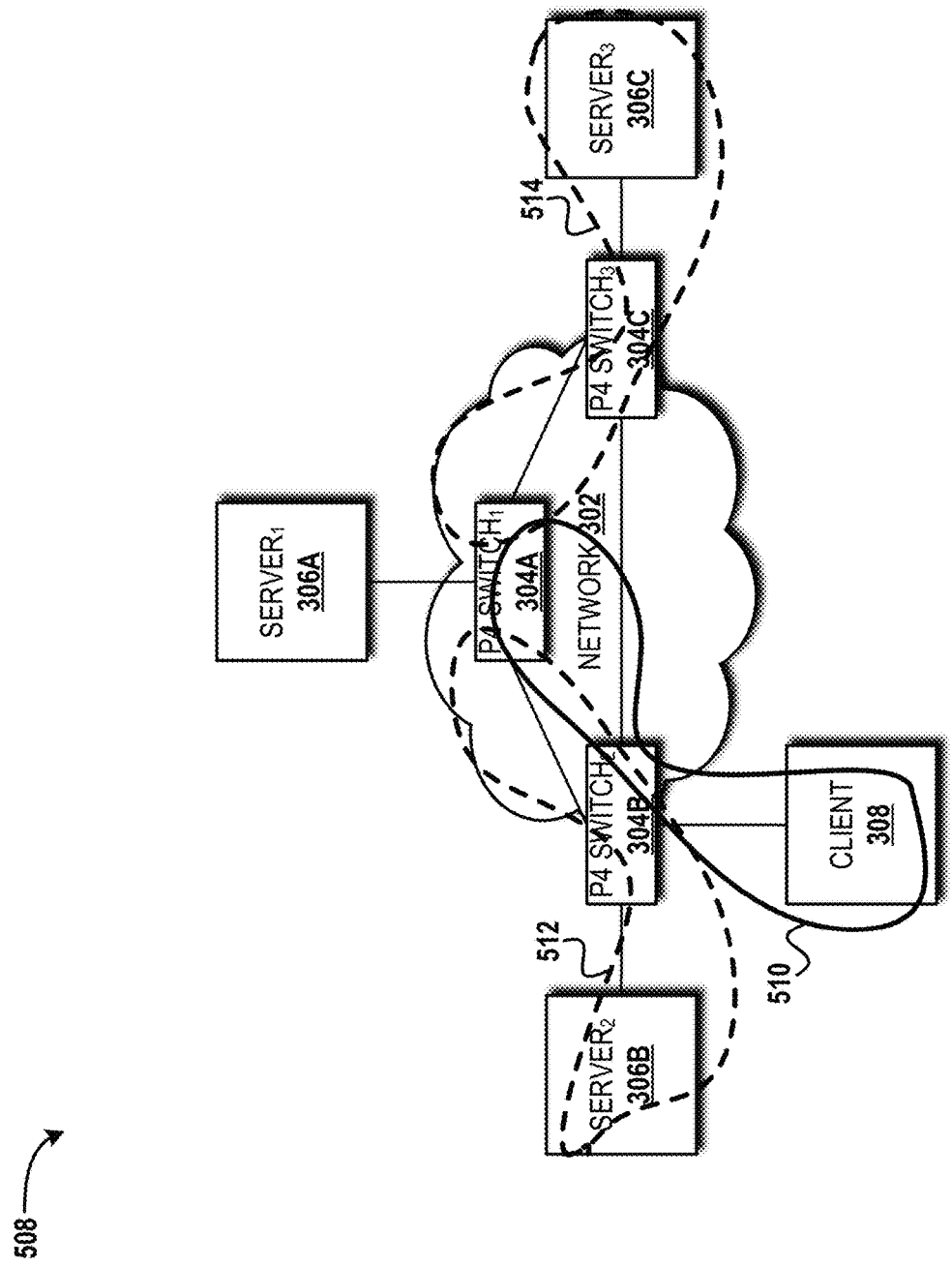
FIG. 5B is a block diagram illustrating aspects of a NetRaft write operation.

Turning now to FIGS. 5A-5B, block diagrams illustrating a comparison between a write operation as performed by legacy Raft (500) and a write operation as performed by NetRaft (508) will be described. In both cases, the client 308 sends a write request (502) to the leader 106 (SERVER$_1$ 306A). In legacy Raft (500), the SERVER$_1$ 306A will then notify the SERVER$_2$ 306B and the SERVER$_3$ 306C of the write results (504, 506, respectively). In NetRaft 508, after a Raft-aware switch, P4 SWITCH$_1$ 304A, connected to the SERVER$_1$ 306A receives a write request (510), the P4 SWITCH$_1$ 304A can handle the write request and notify the results to the SERVER$_2$ 306B and the SERVER$_3$ 306C directly without involving the SERVER$_1$ 306A (512, 514, respectively). Moreover, when the P4 SWITCH$_2$ 304B and the P4 SWITCH$_3$ 304C receive the results, these P4 switches can respond immediately.

Figure 6:
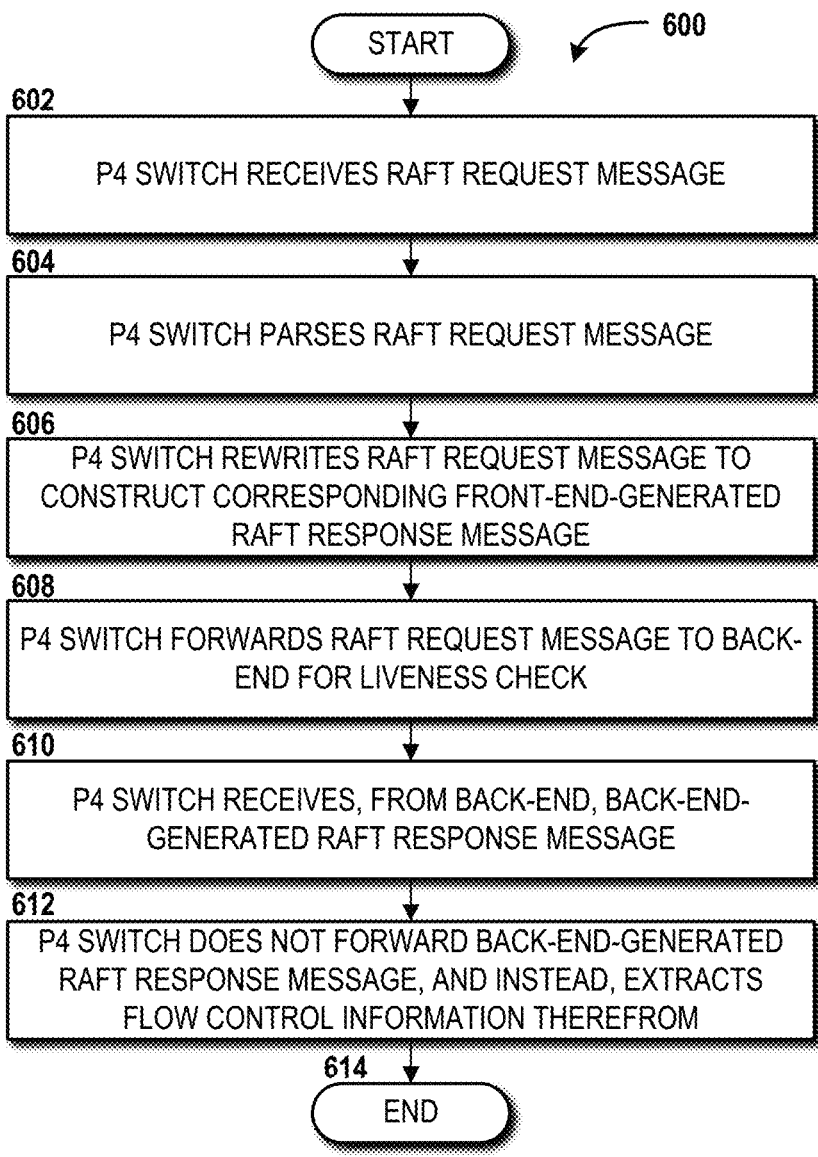
FIG. 6 is a flow diagram illustrating aspects of a method for operating a Raft-aware P4 switch, according to an illustrative embodiment of the concepts and technologies disclosed herein.

Turning now to FIG. 6, aspects of a method 600 for operating a Raft-aware P4 switch, such as one of the P4 switches 304, will be described, according to an illustrative embodiment of the concepts and technologies disclosed herein. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, servers, routers, switches, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor or other processing component(s) disclosed herein to perform operations. It should be understood that the performance of one or more operations may include operations executed by one or more virtual processors at the instructions of one or more of the aforementioned hardware processors.

The method 600 begins and proceeds to operation 602, where the P4 switch 304 receives a Raft request message. From operation 602, the method 600 proceeds to operation 604, where the P4 switch 304 parses the raft request message. From operation 604, the method 600 proceeds to operation 606, where the P4 switch 304 rewrites the Raft request message to construct a corresponding front-end-generated Raft response message. From operation 606, the method 600 proceeds to operation 608, where the P4 switch 304 forwards the Raft request message to the back-end 318 for a liveness check. From operation 608, the method 600 proceeds to operation 610, where the P4 switch 304 receives, from the back-end 318, a back-end-generated Raft response message. From operation 610, the method 600 proceeds to operation 612, where the P4 switch 304 does not forward the back-end-generated Raft response message, and instead, extracts flow control information therefrom. From operation 612, the method 600 proceeds to operation 614, where the method 600 ends.

Figure 7:
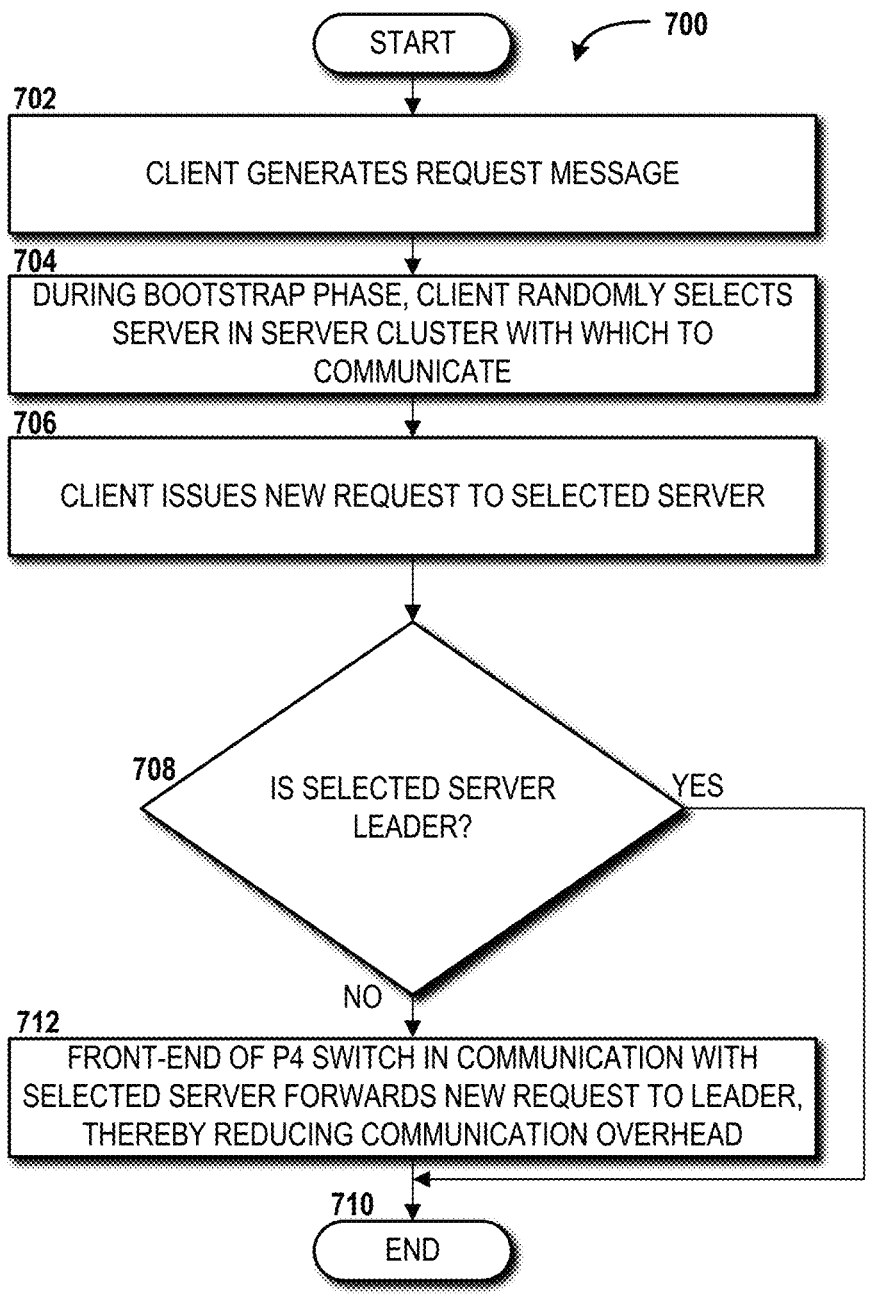
FIG. 7 is a flow diagram illustrating aspects of a method for server selection, according to an illustrative embodiment of the concepts and technologies disclosed herein.

Turning now to FIG. 7, a flow diagram illustrating aspects of a method 700 for server selection will be described, according to an illustrative embodiment of the concepts and technologies disclosed herein. The method 700 begins and proceeds to operation 702, where the client 308 generates a request message. From operation 702, the method 700 proceeds to operation 704, where, during a bootstrap phase, the client 308 randomly selects one of the servers 306 in a server cluster with which to communicate. From operation 704, the method 700 proceeds to operation 706, where the client 308 issues a new request to the selected server. From operation 706, the method 700 proceeds to operation 708, where it is determined if the selected server is operating in the leader state 106. If the selected server is operating in the leader state 106, the method 700 proceeds to operation 710, where the method 700 ends. If, however, the selected server is not operating in the leader state 106, the method 700 proceeds to operation 712, where the front-end 310 of the P4 switch 304 in communication with the selected server forwards a new request to the leader 106, thereby reducing the communication overhead generated in legacy Raft. From operation 712, the method 700 proceeds to operation 710, where the method 700 ends.

Figure 8:
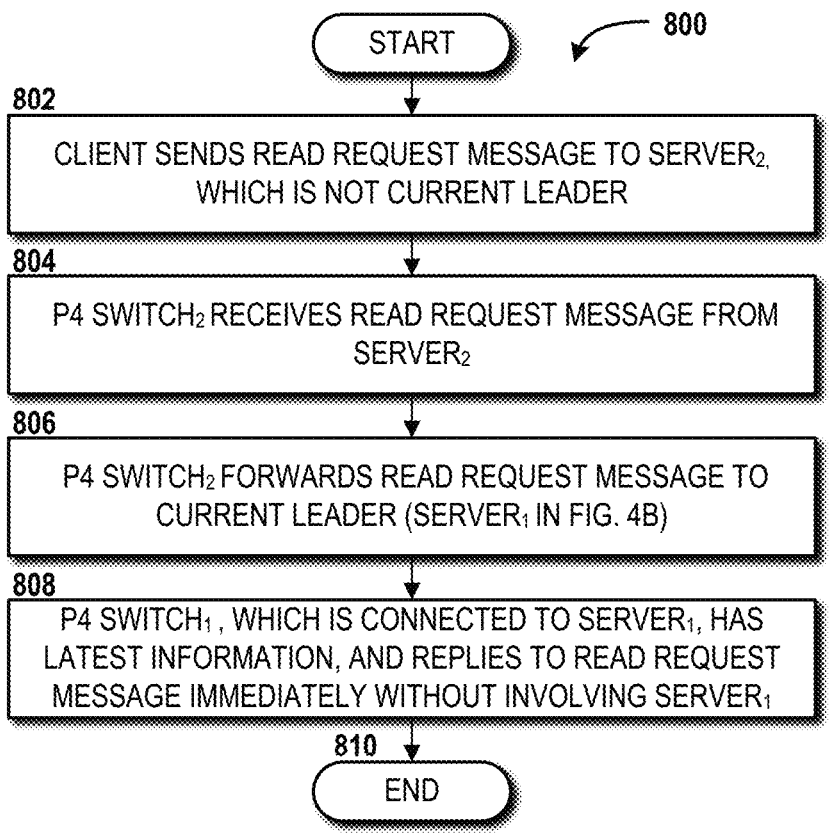
FIG. 8 is a flow diagram illustrating aspects of a method for executing a NetRaft read operation, according to an illustrative embodiment of the concepts and technologies disclosed herein.

Turning now to FIG. 8, a flow diagram illustrating aspects of a method 800 for executing a NetRaft read operation will be described, according to an illustrative embodiment of the concepts and technologies disclosed herein. The method 800 will be described with reference to FIG. 8 and additional reference to FIG. 4B. The method 800 begins and proceeds to operation 802, where the client 308 sends a read request message to the $SERVER_2$ 306B, which is not the current leader 106 in the server cluster. From operation 802, the method 800 proceeds to operation 804, where the P4 $SWITCH_2$ 304B receives the read request message from the $SERVER_2$ 306B. From operation 804, the method 800 proceeds to operation 806, where the P4 $SWITCH_2$ 304B forwards the read request message to the current leader (the $SERVER_1$ 306A in FIG. 4B). From operation 806, the method 800 proceeds to operation 808, where the P4 $SWITCH_1$ 304A, which is connected to the $SERVER_1$ 306A, has the latest information, and replies to the read request message immediately without involving the $SERVER_1$ 306A. From operation 808, the method 800 proceeds to operation 810, where the method 800 ends.

Figure 9:
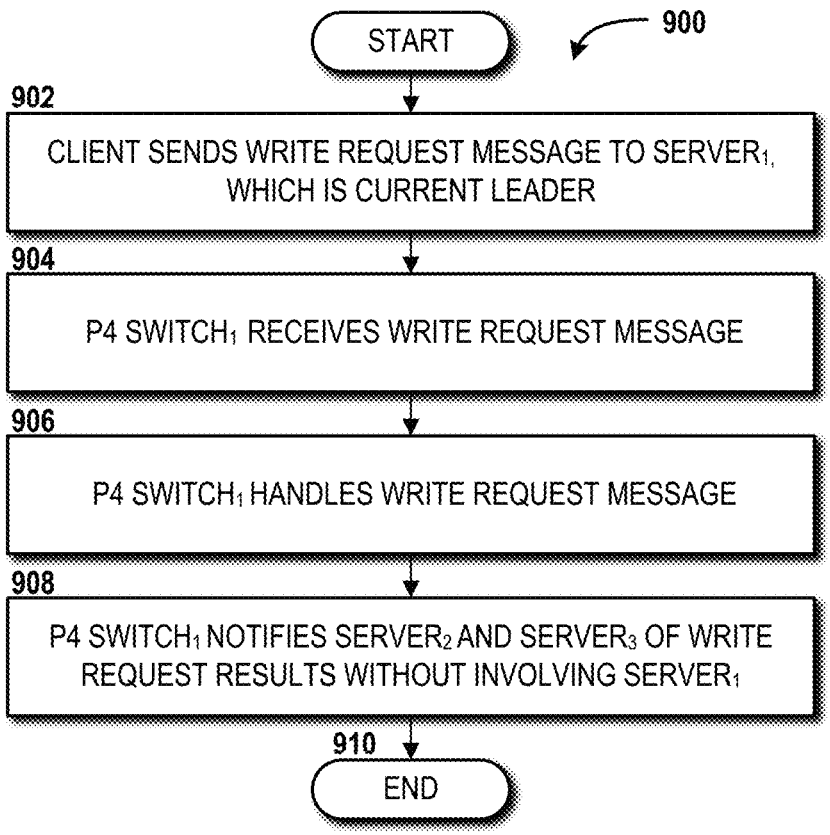
FIG. 9 is a flow diagram illustrating aspects of a method for executing a NetRaft write operation, according to an illustrative embodiment of the concepts and technologies disclosed herein.

Turning now to FIG. 9, a flow diagram illustrating aspects of a method 900 for executing a NetRaft write operation will be described, according to an illustrative embodiment of the concepts and technologies disclosed herein. The method 900 will be described with reference to FIG. 9 and additional reference to FIG. 5B. The method 900 begins and proceeds to operation 902, where the client 308 sends a write request message to the $SERVER_1$ 306A, which is the current leader 106 in the server cluster. From operation 902, the method 900 proceeds to operation 904, where the P4 $SWITCH_1$ 304A receives a write request message. From operation 904, the method 900 proceeds to operation 906, where the P4 $SWITCH_1$ 304A handles the write request message. From operation 906, the method 900 proceeds to operation 908, where the P4 $SWITCH_1$ 304A notifies the $SERVER_2$ 306B and the $SERVER_3$ 306C of the write request results without involving the $SERVER_1$ 306A. From operation 908, the method 900 proceeds to operation 910, where the method 900 ends.

Figure 10:
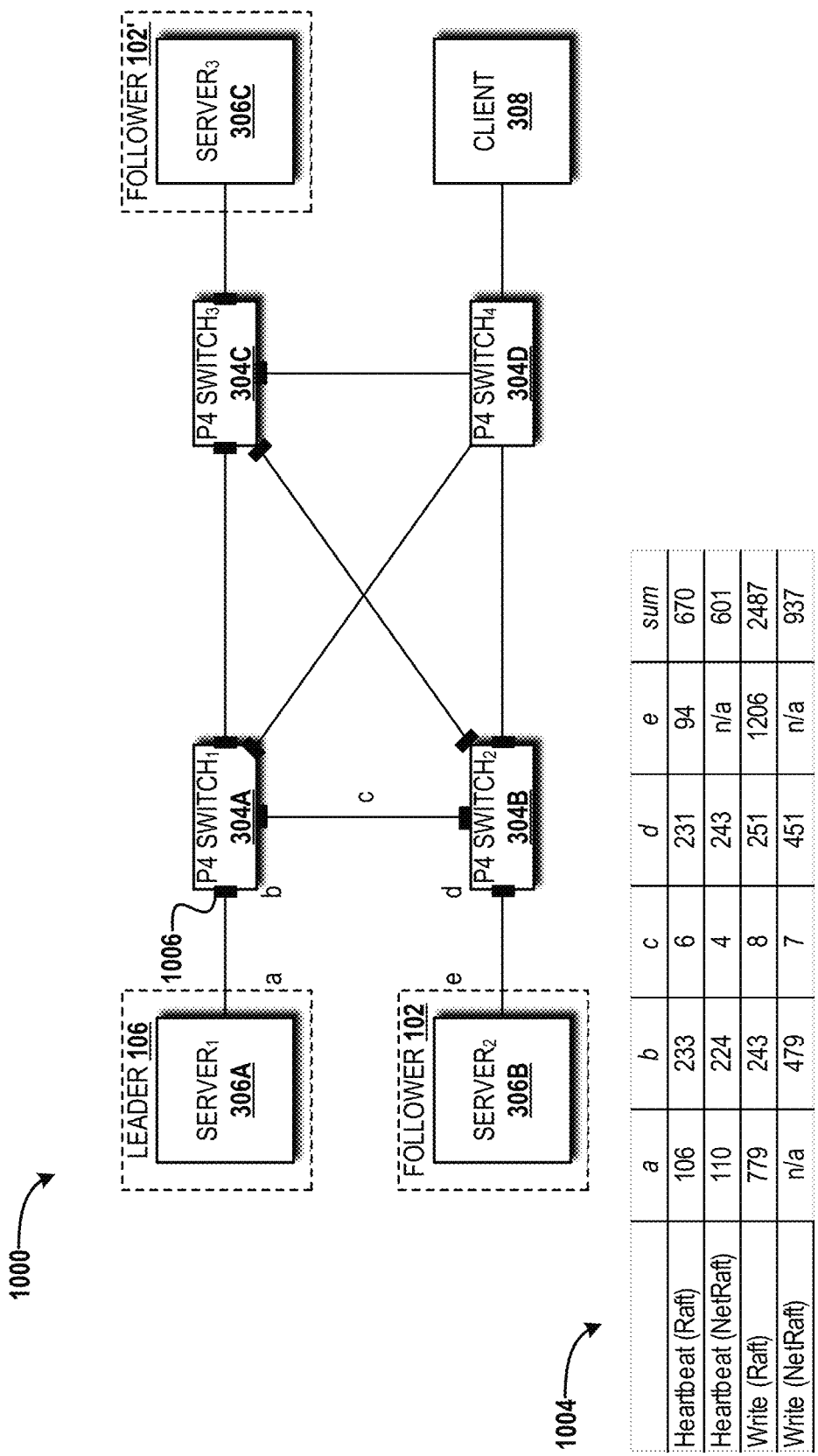
FIG. 10 is a block diagram illustrating an example experimental setup for a NetRaft implementation, according to an illustrative embodiment.

Turning now to FIG. 10, a block diagram illustrating an example experimental setup 1000 for a NetRaft implementation will be described, according to an illustrative embodiment. The experimental setup 1000 shows the $SERVER_1$ 306A operating as the leader 106, and the $SERVER_2$ 306B and the $SERVER_3$ 306C operating as followers 102, 102'. The P4 switches 304A-304D are also shown. The client 308 is in communication with the P4 $SWITCH_4$ 304D.

In the experimental setup 1000, the interval of RPC calls can be measured (e.g., using LogCabin or similar software) and the timestamps for each RCP call can be recorded by network interface controllers ("NICs") 1006 of each P4 switch 304. The latency (in μs) between the leader 106 and the followers 102, 102' for a heartbeat message and the client's write requests are shown in a table 1004. The latency is decomposed into several fine-grained segments. Latency savings from NetRaft over Raft can be observed for both heartbeat messages and write request messages. Moreover, the experimental setup 1000 demonstrates that NetRaft does not add significant memory usage for P4 switches 304 compared to P4 switches 304 performing regular forwarding. It should be noted that the results shown in the table 1004 are from a simulation of one P4 switch 304. Those skilled in the art will appreciate the expectancy of better performance when running the front-end 310 disclosed herein for NetRaft on a real hardware P4 switch.

The table 1004 shows the decomposed latency between a leader 106 and a follower 102. Column a shows RPC latency at the leader side and the bidirectional latency between SERVER$_1$ 306A and P4 SWITCH$_4$ 304D. Column b shows the bidirectional latency in P4 SWITCH$_1$ 304A. Column c shows the bidirectional latency between P4 SWITCH$_1$ 304A and P4 SWITCH$_2$ 304B. Column d shows the bidirectional latency in P4 SWITCH$_2$ 304B. Column e shows bidirectional latency between P4 SWITCH$_2$ 304B and SERVER$_2$ 306B and the latency of the follower 102.

Figure 11:
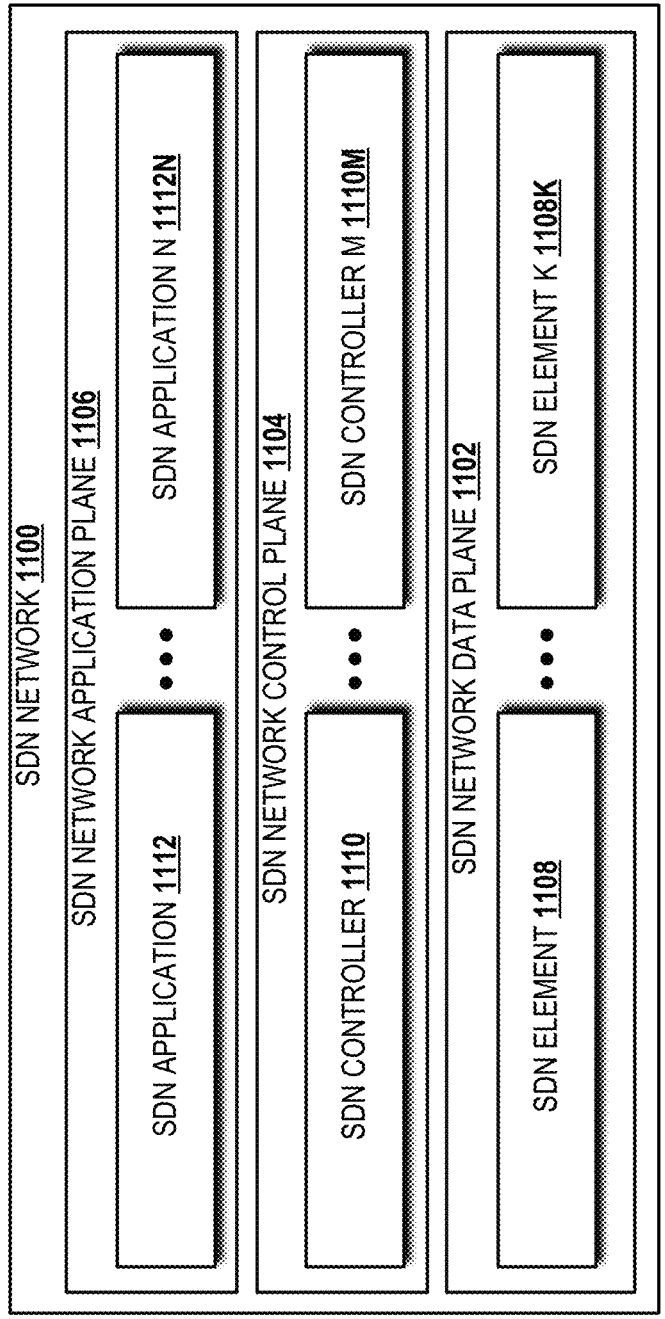
FIG. 11 is a block diagram illustrating a software-defined networking ("SDN") network capable of implementing aspects of the embodiments disclosed herein.

Turning now to FIG. 11, a block diagram illustrating aspects of an SDN network 1100 for implementing various aspects of the concepts and technologies disclosed herein will be described. The illustrated SDN network 1100 includes a SDN network data plane 1102, a SDN network control plane 1104, and a SDN network application plane 1106.

The SDN network data plane 1102 is a network plane responsible for bearing data traffic. The illustrated SDN network data plane 1102 includes SDN elements 1108-1108K. The SDN elements 1108-1108K can be or can include SDN-enabled network elements such as switches, routers, gateways, the like, or any combination thereof. In accordance with the concepts and technologies disclosed herein, the SDN elements 1108-1108K can include the P4 switches 304.

The SDN network control plane 1104 is a network plane responsible for controlling elements of the SDN network data plane 1102. The illustrated SDN network control plane 1104 includes SDN controllers 1110-1110M. The SDN controllers 1110-1110M are logically centralized network entities that perform operations, including translating an intent of one or more SDN applications 1112-1112N operating within the SDN network application plane 1106 to rules and action sets that are useable by the SDN elements 1108-1108K operating within the SDN network data plane 1102.

The rules can include criterion such as, for example, switch port, VLAN ID, VLAN PCP, MAC source address, MAC destination address, Ethernet type, IP source address, IP destination address, IP ToS, IP Protocol, L4 Source Port, and L4 Destination Port. The rules can be matched to one or more actions such as, for example, an action to forward traffic to one or more ports, an action to drop one or more packets, an action to encapsulate one or more packets and forward to a controller, an action to send one or more packets to a normal processing pipeline, and an action to modify one or more fields of one or more packets. Those skilled in the art will appreciate the breadth of possible rule and action sets utilized in a particular implementation to achieve desired results. As such, the aforementioned examples should not be construed as being limiting in any way.

The illustrated SDN network application plane 1106 is a network plane responsible for providing the SDN applications 1112-1112N. The SDN applications 1112-1112N are programs that can explicitly, directly, and programmatically communicate network requirements/intents and desired network behavior to the SDN controllers 1110-1110M.

Figure 12:
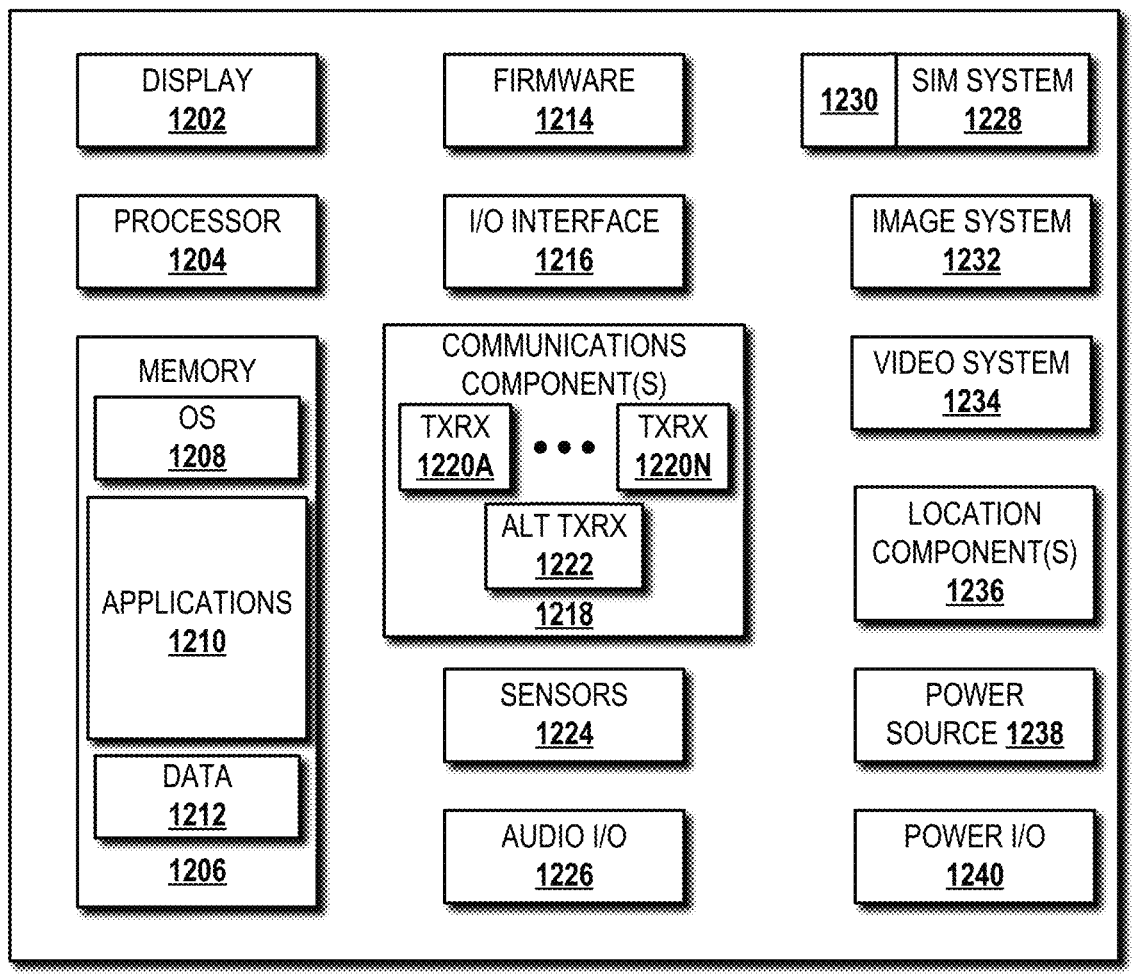
FIG. 12 is a block diagram illustrating an example mobile device capable of implementing aspects of the embodiments disclosed herein.

Turning now to FIG. 12, an illustrative mobile device 1200 and components thereof will be described. In some embodiments, the client 308 is/are configured the same as or similar to the mobile device 1200. While connections are not shown between the various components illustrated in FIG. 12, it should be understood that some, none, or all of the components illustrated in FIG. 12 can be configured to interact with one other to carry out various device functions. In some embodiments, the components are arranged so as to communicate via one or more busses (not shown). Thus, it should be understood that FIG. 12 and the following description are intended to provide a general understanding of a suitable environment in which various aspects of embodiments can be implemented, and should not be construed as being limiting in any way.

As illustrated in FIG. 12, the mobile device 1200 can include a display 1202 for displaying data. According to various embodiments, the display 1202 can be configured to display various GUI elements, text, images, video, virtual keypads and/or keyboards, messaging data, notification messages, metadata, internet content, device status, time, date, calendar data, device preferences, map and location data, combinations thereof, and/or the like. The mobile device 1200 also can include a processor 1204 and a memory or other data storage device ("memory") 1206. The processor 1204 can be configured to process data and/or can execute computer-executable instructions stored in the memory 1206. The computer-executable instructions executed by the processor 1204 can include, for example, an operating system 1208, one or more applications 1210, other computer-executable instructions stored in a memory 1206, or the like. In some embodiments, the applications 1210 also can include a user interface ("UI") application (not illustrated in FIG. 12).

The UI application can interface with the operating system 1208 to facilitate user interaction with functionality and/or data stored at the mobile device 1200 and/or stored elsewhere. In some embodiments, the operating system 1208 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1204 to aid a user in dialing telephone numbers, entering content, viewing account information, answering/initiating calls, entering/deleting data, entering and setting user IDs and passwords for device access, configuring settings, manipulating address book content and/or settings, multimode interaction, interacting with other applications 1210, and otherwise facilitating user interaction with the operating system 1208, the applications 1210, and/or other types or instances of data 1212 that can be stored at the mobile device 1200. According to various embodiments, the data 1212 can include, for example, telephone dialer applications, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 1210, the data 1212, and/or portions thereof can be stored in the memory 1206 and/or in a firmware 1214, and can be executed by the processor 1204. The firmware 1214 also can store code for execution during device power up and power down operations. It can be appreciated that the firmware 1214 can be stored in a volatile or non-volatile data storage device including, but not limited to, the memory 1206 and/or a portion thereof.

The mobile device 1200 also can include an input/output ("I/O") interface 1216. The I/O interface 1216 can be configured to support the input/output of data such as location information, user information, organization information, presence status information, user IDs, passwords, and application initiation (start-up) requests. In some embodiments, the I/O interface 1216 can include a hardwire connection such as USB port, a mini-USB port, a micro-USB port, an audio jack, a PS2 port, an IEEE 1394 ("FIREWIRE") port, a serial port, a parallel port, an Ethernet (RJ45) port, an RJ10 port, a proprietary port, combinations thereof, or the like. In some embodiments, the mobile device 1200 can be configured to synchronize with another device to transfer content to and/or from the mobile device 1200. In some embodiments, the mobile device 1200 can be configured to receive updates to one or more of the applications 1210 via the I/O interface 1216, though this is not necessarily the case. In some embodiments, the I/O interface 1216 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1216 may be used for communications between the mobile device 1200 and a network device or local device.

The mobile device 1200 also can include a communications component 1218. The communications component 1218 can be configured to interface with the processor 1204 to facilitate wired and/or wireless communications with one or more networks such as one or more IP access networks and/or one or more circuit access networks. In some embodiments, other networks include networks that utilize non-cellular wireless technologies such as WI-FI or WIMAX. In some embodiments, the communications component 1218 includes a multimode communications subsystem for facilitating communications via the cellular network and one or more other networks.

The communications component 1218, in some embodiments, includes one or more transceivers. The one or more transceivers, if included, can be configured to communicate over the same and/or different wireless technology standards with respect to one another. For example, in some embodiments one or more of the transceivers of the communications component 1218 may be configured to communicate using GSM, CDMA ONE, CDMA2000, LTE, and various other 2G, 2.5G, 3G, 4G, 5G, and greater generation technology standards. Moreover, the communications component 1218 may facilitate communications over various channel access methods (which may or may not be used by the aforementioned standards) including, but not limited to, TDMA, FDMA, W-CDMA, OFDM, SDMA, and the like.

In addition, the communications component 1218 may facilitate data communications using GPRS, EDGE, HSPA protocol family including HSDPA, EUL or otherwise termed HSUPA, HSPA+, and various other current and future wireless data access standards. In the illustrated embodiment, the communications component 1218 can include a first transceiver ("TxRx") 1220A that can operate in a first communications mode (e.g., GSM). The communications component 1218 also can include an $N^{th}$ transceiver ("TxRx") 1220N that can operate in a second communications mode relative to the first transceiver 1220A (e.g., UMTS). While two transceivers 1220A-1220N (hereinafter collectively and/or generically referred to as "transceivers 1220") are shown in FIG. 12, it should be appreciated that less than two, two, and/or more than two transceivers 1220 can be included in the communications component 1218.

The communications component 1218 also can include an alternative transceiver ("Alt TxRx") 1222 for supporting other types and/or standards of communications. According to various contemplated embodiments, the alternative transceiver 1222 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 1218 also can facilitate reception from terrestrial radio networks, digital satellite radio networks, internet-based radio service networks, combinations thereof, and the like. The communications component 1218 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1200 also can include one or more sensors 1224. The sensors 1224 can include temperature sensors, light sensors, air quality sensors, movement sensors, orientation sensors, noise sensors, proximity sensors, or the like. As such, it should be understood that the sensors 1224 can include, but are not limited to, accelerometers, magnetometers, gyroscopes, infrared sensors, noise sensors, microphones, combinations thereof, or the like. Additionally, audio capabilities for the mobile device 1200 may be provided by an audio I/O component 1226. The audio I/O component 1226 of the mobile device 1200 can include one or more speakers for the output of audio signals, one or more microphones for the collection and/or input of audio signals, and/or other audio input and/or output devices.

The illustrated mobile device 1200 also can include a subscriber identity module ("SIM") system 1228. The SIM system 1228 can include a universal SIM ("USIM"), a universal integrated circuit card ("UICC") and/or other identity devices. The SIM system 1228 can include and/or can be connected to or inserted into an interface such as a slot interface 1230. In some embodiments, the slot interface 1230 can be configured to accept insertion of other identity cards or modules for accessing various types of networks. Additionally, or alternatively, the slot interface 1230 can be configured to accept multiple subscriber identity cards.

Because other devices and/or modules for identifying users and/or the mobile device 1200 are contemplated, it should be understood that these embodiments are illustrative, and should not be construed as being limiting in any way.

The mobile device 1200 also can include an image capture and processing system 1232 ("image system"). The image system 1232 can be configured to capture or otherwise obtain photos, videos, and/or other visual information. As such, the image system 1232 can include cameras, lenses, charge-coupled devices ("CCDs"), combinations thereof, or the like. The mobile device 1200 may also include a video system 1234. The video system 1234 can be configured to capture, process, record, modify, and/or store video content. Photos and videos obtained using the image system 1232 and the video system 1234, respectively, may be added as message content to a multimedia message service ("MMS") message, email message, and sent to another mobile device. The video and/or photo content also can be shared with other devices via various types of data transfers via wired and/or wireless communication devices as described herein.

The mobile device 1200 also can include one or more location components 1236. The location components 1236 can be configured to send and/or receive signals to determine a geographic location of the mobile device 1200. According to various embodiments, the location components 1236 can send and/or receive signals from GPS devices, assisted GPS ("A-GPS") devices, WI-FI/WIMAX and/or cellular network triangulation data, combinations thereof, and the like. The location component 1236 also can be configured to communicate with the communications component 1218 to retrieve triangulation data for determining a location of the mobile device 1200. In some embodiments, the location component 1236 can interface with cellular network nodes, telephone lines, satellites, location transmitters and/or beacons, wireless network transmitters and receivers, combinations thereof, and the like. In some embodiments, the location component 1236 can include and/or can communicate with one or more of the sensors 1224 such as a compass, an accelerometer, and/or a gyroscope to determine the orientation of the mobile device 1200. Using the location component 1236, the mobile device 1200 can generate and/or receive data to identify its geographic location, or to transmit data used by other devices to determine the location of the mobile device 1200. The location component 1236 may include multiple components for determining the location and/or orientation of the mobile device 1200.

The illustrated mobile device 1200 also can include a power source 1238. The power source 1238 can include one or more batteries, power supplies, power cells, and/or other power subsystems including alternating current ("AC") and/or direct current ("DC") power devices. The power source 1238 also can interface with an external power system or charging equipment via a power I/O component 1240. Because the mobile device 1200 can include additional and/or alternative components, the above embodiment should be understood as being illustrative of one possible operating environment for various embodiments of the concepts and technologies described herein. The described embodiment of the mobile device 1200 is illustrative, and should not be construed as being limiting in any way.

Figure 13:
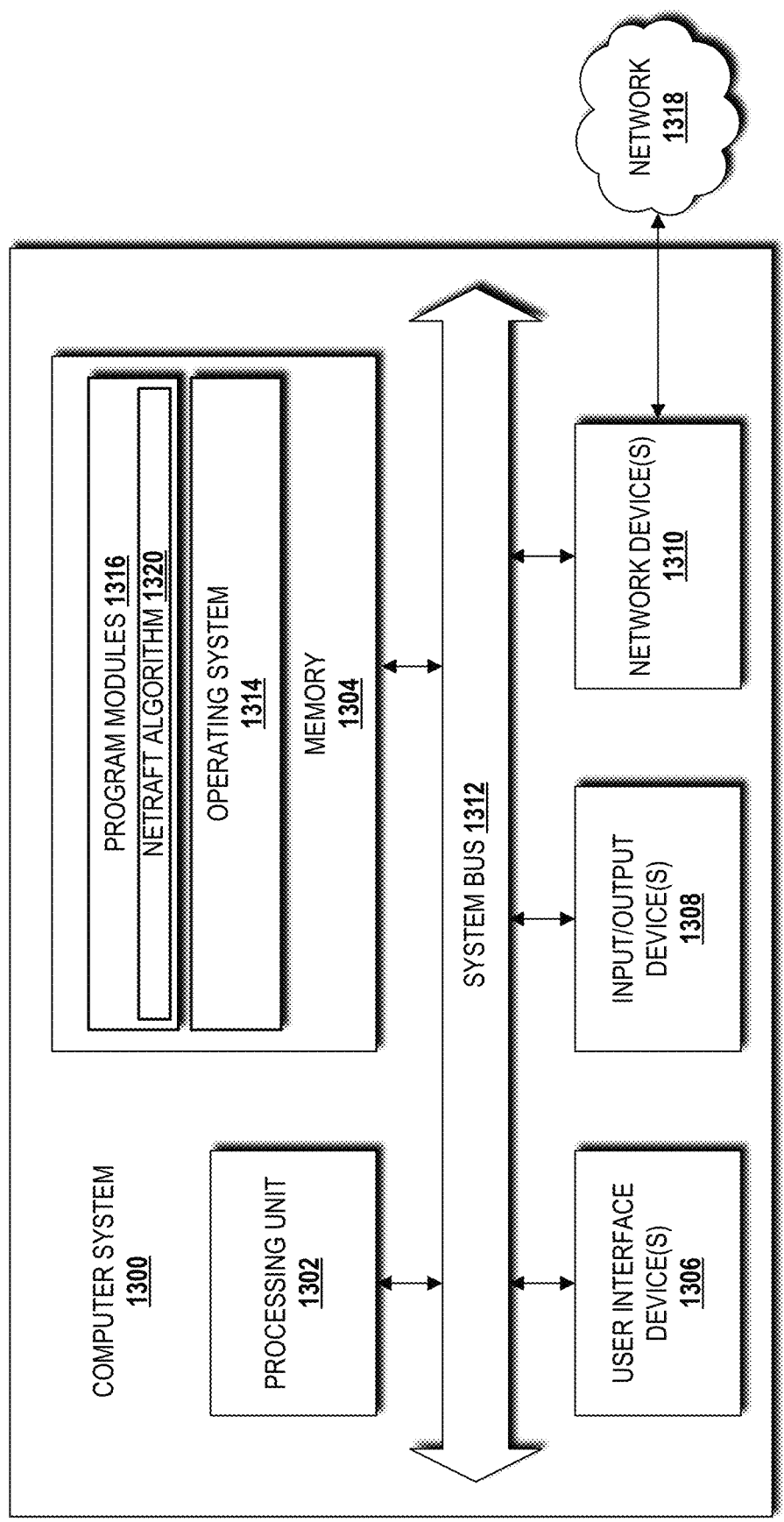
FIG. 13 is a block diagram illustrating an example computer system capable of implementing aspects of the embodiments presented herein.

FIG. 13 is a block diagram illustrating a computer system 1300 configured to provide the functionality in accordance with various embodiments of the concepts and technologies disclosed herein. In some embodiments, the P4 switches 304, the servers 306, and/or the client 308 can be configured, at least in part, like the architecture of the computer system 1300. It should be understood, however, that modification to the architecture may be made to facilitate certain interactions among elements described herein.

The computer system 1300 includes a processing unit 1302, a memory 1304, one or more user interface devices 1306, one or more input/output ("I/O") devices 1308, and one or more network devices 1310, each of which is operatively connected to a system bus 1312. The bus 1312 enables bi-directional communication between the processing unit 1302, the memory 1304, the user interface devices 1306, the I/O devices 1308, and the network devices 1310.

The processing unit 1302 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 1304 communicates with the processing unit 1302 via the system bus 1312. In some embodiments, the memory 1304 is operatively connected to a memory controller (not shown) that enables communication with the processing unit 1302 via the system bus 1312. The illustrated memory 1304 includes an operating system 1314 and one or more program modules 1316. The operating system 1314 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 1316 may include various software and/or program modules to perform the various operations described herein. The program modules 1316 and/or other programs can be embodied in computer-readable media containing instructions that, when executed by the processing unit 1302, perform various operations such as those described herein. According to embodiments, the program modules 1316 may be embodied in hardware, software, firmware, or any combination thereof. In the illustrated example, the program modules 1316 include a NetRaft algorithm 1320, which can be implemented as the partial Raft algorithm 312 in the front-end 310 of the P4 switch 304, or as the complete Raft algorithm 320 in the back-end 318 of the server 306.

By way of example, and not limitation, computer-readable media may include any available computer storage media or communication media that can be accessed by the computer system 1300. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1300. In the claims, the phrase "computer storage medium" and variations thereof does not include waves or signals per se and/or communication media.

The user interface devices 1306 may include one or more devices with which a user accesses the computer system 1300. The user interface devices 1306 may include, but are not limited to, computers, servers, PDAs, cellular phones, or any suitable computing devices. The I/O devices 1308 enable a user to interface with the program modules 1316. In one embodiment, the I/O devices 1308 are operatively connected to an I/O controller (not shown) that enables communication with the processing unit 1302 via the system bus 1312. The I/O devices 1308 may include one or more input devices, such as, but not limited to, a keyboard, a mouse, or an electronic stylus. Further, the I/O devices 1308 may include one or more output devices, such as, but not limited to, a display screen or a printer. In some embodiments, the I/O devices 1308 can be used for manual controls for operations to exercise under certain emergency situations.

The network devices 1310 enable the computer system 1300 to communicate with other networks or remote systems via a network 1318, which can be or can include the network 302. Examples of the network devices 1310 include, but are not limited to, a modem, a radio frequency ("RF") or infrared ("IR") transceiver, a telephonic interface, a bridge, a router, or a network card. The network 1318 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 1318 may be a wired network such as, but not limited to, a Wide Area Network ("WAN"), a wired Personal Area Network ("PAN"), or a wired Metropolitan Area Network ("MAN"). The network 1318 may be any other network described herein.

Figure 14:
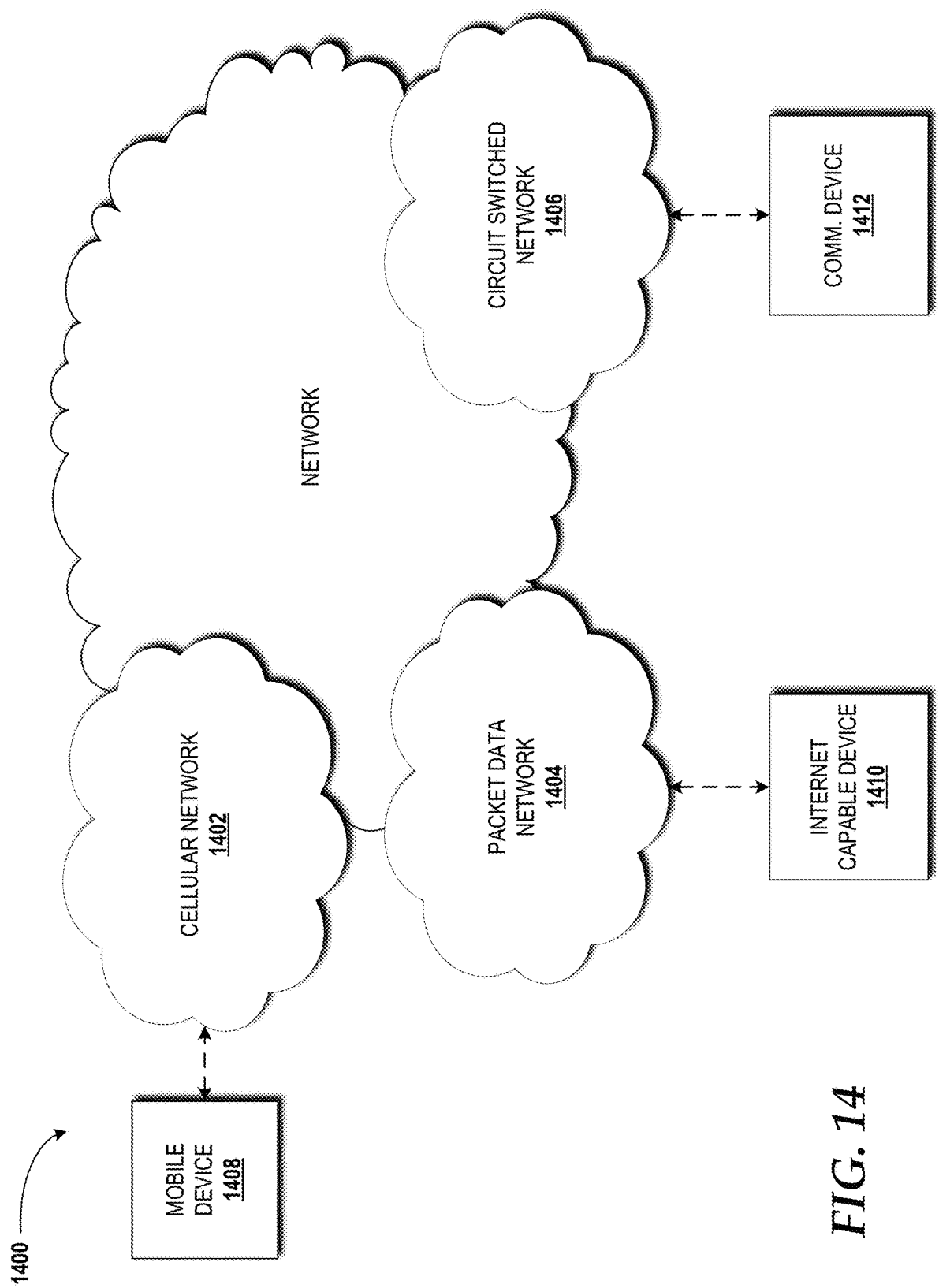
FIG. 14 is a diagram illustrating a network, according to an illustrative embodiment.

Turning now to FIG. 14, details of a network 1400 are illustrated, according to an illustrative embodiment. The network 302 can be or can include at least a portion of the network 1400. The network 1400 includes a cellular network 1402, a packet data network 1404, for example, the Internet, and a circuit switched network 1406, for example, a PSTN. The cellular network 1402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1402 also includes radios and nodes for receiving and transmitting voice, data, and combinations thereof to and from radio transceivers, networks, the packet data network 1404, and the circuit switched network 1406.

A mobile communications device 1408, such as, for example, the client 308, a cellular telephone, a user equipment, a mobile terminal, a PDA, a laptop computer, a handheld computer, and combinations thereof, can be operatively connected to the cellular network 1402. The cellular network 1402 can be configured as a 2G GSM network and can provide data communications via GPRS and/or EDGE. Additionally, or alternatively, the cellular network 1402 can be configured as a 3G UMTS network and can provide data communications via the HSPA protocol family, for example, HSDPA, EUL (also referred to as HSUPA), and HSPA+. The cellular network 1402 also is compatible with 4G mobile communications standards such as LTE, or the like, as well as evolved and future mobile standards.

The packet data network 1404 includes various devices, for example, servers, computers, databases, and other devices in communication with one another, as is generally known. The packet data network 1404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1404 includes or is in communication with the Internet. The circuit switched network 1406 includes various hardware and software for providing circuit switched communications. The circuit switched network 1406 may include, or may be, what is often referred to as a POTS. The functionality of a circuit switched network 1406 or other circuit-switched network are generally known and will not be described herein in detail.

The illustrated cellular network 1402 is shown in communication with the packet data network 1404 and a circuit switched network 1406, though it should be appreciated that this is not necessarily the case. One or more Internet-capable devices 1410, for example, the client 308, a PC, a laptop, a portable device, or another suitable device, can communicate with one or more cellular networks 1402, and devices connected thereto, through the packet data network 1404. It also should be appreciated that the Internet-capable device 1410 can communicate with the packet data network 1404 through the circuit switched network 1406, the cellular network 1402, and/or via other networks (not illustrated).

As illustrated, a communications device 1412, for example, a telephone, facsimile machine, modem, computer, or the like, can be in communication with the circuit switched network 1406, and therethrough to the packet data network 1404 and/or the cellular network 1402. It should be appreciated that the communications device 1412 can be an Internet-capable device, and can be substantially similar to the Internet-capable device 1410. In the specification, the network 302 is used to refer broadly to any combination of the networks 1402, 1404, 1406 shown in FIG. 10.

Figure 15:
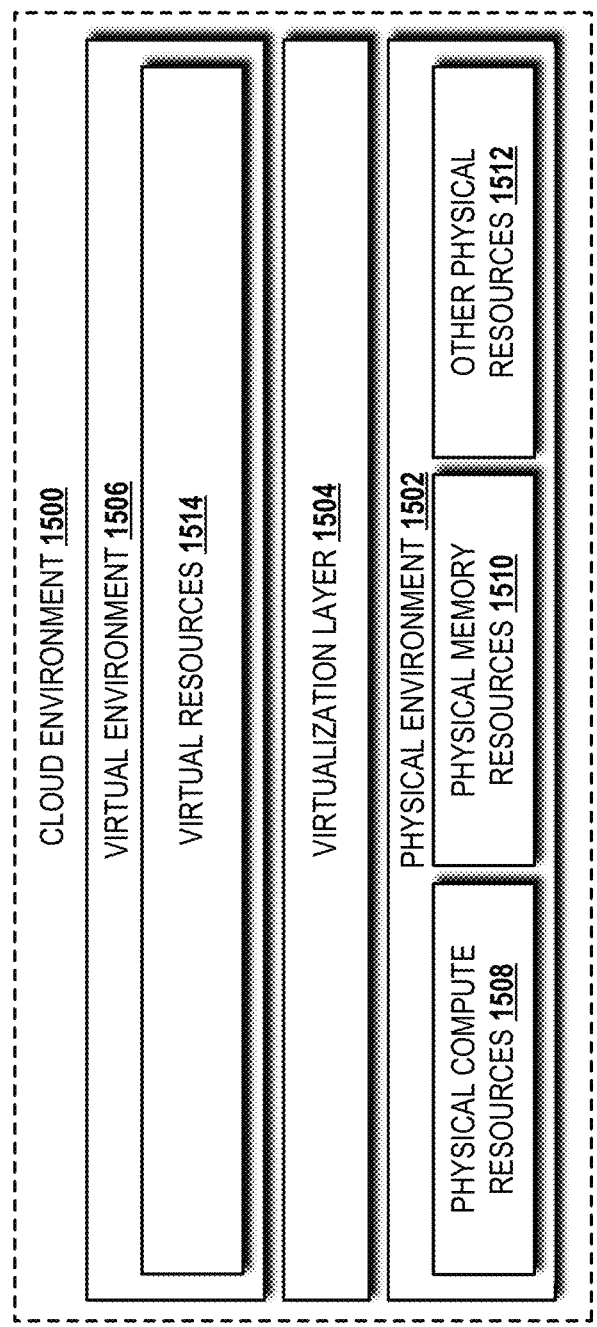
FIG. 15 is a block diagram illustrating aspects of an illustrative cloud environment capable of implementing aspects of the embodiments presented herein.

Turning now to FIG. 15, an illustrative cloud environment 1500 will be described, according to an illustrative embodiment. In some embodiments, the client 308, the servers 306, and/or the P4 switches 304 can be implemented, at least in part, in the cloud environment 1500. The cloud environment 1500 includes a physical environment 1502, a virtualization layer 1504, and a virtual environment 1506. While no connections are shown in FIG. 15, it should be understood that some, none, or all of the components illustrated in FIG. 15 can be configured to interact with one other to carry out various functions described herein. In some embodiments, the components are arranged so as to communicate via one or more networks, such as the network 302. Thus, it should be understood that FIG. 15 and the remaining description are intended to provide a general understanding of a suitable environment in which various aspects of the embodiments described herein can be implemented, and should not be construed as being limiting in any way.

The physical environment 1502 provides hardware resources, which, in the illustrated embodiment, include one or more physical compute resources 1508, one or more physical memory resources 1510, and one or more other physical resources 1512. The physical compute resource(s) 1508 can include one or more hardware components that perform computations to process data and/or to execute computer-executable instructions of one or more application programs, one or more operating systems, and/or other software.

The physical compute resources 1508 can include one or more central processing units ("CPUs") configured with one or more processing cores. The physical compute resources 1508 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 1508 can include one or more discrete GPUs. In some other embodiments, the physical compute resources 1508 can include CPU and GPU components that are configured in accordance with a co-processing CPU/GPU computing model, wherein the sequential part of an application executes on the CPU and the computationally-intensive part is accelerated by the GPU processing capabilities. The physical compute resources 1508 can include one or more system-on-chip ("SoC") components along with one or more other components, including, for example, one or more of the physical memory resources 1510, and/or one or more of the other physical resources 1512. In some embodiments, the physical compute resources 1508 can be or can include one or more SNAPDRAGON SoCs, available from QUAL-COMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The physical compute resources 1508 can be or can include one or more hardware components architected in accordance with an ARM architecture, available for license from ARM HOLDINGS of Cambridge, United Kingdom. Alternatively, the physical compute resources 1508 can be or can include one or more hardware components architected in accordance with an x86 architecture, such an architecture available from INTEL CORPORATION of Mountain View, Calif., and others. Those skilled in the art will appreciate the implementation of the physical compute resources 1508 can utilize various computation architectures, and as such, the physical compute resources 1508 should not be construed as being limited to any particular computation architecture or combination of computation architectures, including those explicitly disclosed herein.

The physical memory resource(s) 1510 can include one or more hardware components that perform storage/memory operations, including temporary or permanent storage operations. In some embodiments, the physical memory resource(s) 1510 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 1508.

The other physical resource(s) 1512 can include any other hardware resources that can be utilized by the physical compute resources(s) 1508 and/or the physical memory resource(s) 1510 to perform operations described herein. The other physical resource(s) 1512 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 1502 can be virtualized by one or more virtual machine monitors (not shown; also known as "hypervisors") operating within the virtualization/control layer 1504 to create virtual resources 1514 that reside in the virtual environment 1506. The virtual machine monitors can be or can include software, firmware, and/or hardware that alone or in combination with other software, firmware, and/or hardware, creates and manages virtual resources operating within the virtual environment 1506.

The virtual resources 1514 operating within the virtual environment 1506 can include abstractions of at least a portion of the physical compute resources 1508, the physical memory resources 1510, and/or the other physical resources 1512, or any combination thereof. In some embodiments, the abstractions can include one or more virtual machines upon which one or more applications can be executed.

Based on the foregoing, it should be appreciated that concepts and technologies directed to network-assisted Raft consensus algorithm have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting.

Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
receiving, by a first server operating in a server cluster, from a client, a read request message, wherein the first server is not recognized as a leader in the server cluster;
receiving, by a first switch in communication with the first server, from the client, the read request message;
forwarding, by the first switch, the read request message to a second server that is recognized as the leader in the server cluster, wherein the second server comprises a back-end comprising an algorithm, and wherein the back-end executes the algorithm to perform leader election, log replication, and log commitment; and
receiving, by a second switch in communication with the second server, the read request message immediately without involving the second server, wherein the second switch comprises a front-end comprising a partial version of the algorithm, and wherein the front-end executes the partial version of the algorithm to perform the log replication and the log commitment.

2. The method of claim 1, wherein the back-end maintains a complete state on the second server for responding to requests that cannot be fulfilled by the front-end.

3. The method of claim 2, wherein the first server comprises a further back-end comprising the algorithm.

4. The method of claim 3, wherein the first switch comprises a further front-end comprising the partial version of the algorithm.

5. The method of claim 1, wherein the algorithm comprises a consensus algorithm.

6. The method of claim 5, wherein the consensus algorithm comprises a Raft algorithm.

7. A method comprising:
receiving, by a first server operating in a server cluster, from a client, a write request message, wherein the first server is recognized as a leader in the server cluster;
receiving, by a first switch in communication with the first server, from the client, the write request message;
handling, by the first switch, the write request message; and
notifying, by the first switch, without involving the first server, a second server and a third server of the server cluster of write request results resulting from the first switch handling the write request message;
wherein the first server comprises a back-end comprising an algorithm;
wherein the first switch comprises a front-end comprising a partial version of the algorithm; and
wherein the front-end executes the partial version of the algorithm to perform log replication and log commitment.

8. The method of claim 7, wherein the back-end executes the algorithm to perform leader election.

9. The method of claim 7, wherein the second server is in communication with a second switch, and the third server is in communication with a third switch.

10. A system comprising:
a plurality of servers operating in a server cluster, wherein each server of the plurality of servers comprises a back-end that executes an algorithm to perform leader election;
a plurality of switches corresponding to the plurality of servers, wherein each switch of the plurality of switches comprises a front-end that executes a partial version of the algorithm to perform log replication and log commitment;
wherein the back-end maintains a complete state for responding to requests that cannot be fulfilled by the front-end; and
wherein the requests comprise a first request and a second request; and wherein the first request can be fulfilled by the front-end and the second request cannot be fulfilled by the front-end.

11. The system of claim 10, wherein the algorithm comprises a Raft consensus algorithm.

* * * * *